US009683768B2

(12) United States Patent
Takayama et al.

(10) Patent No.: US 9,683,768 B2
(45) Date of Patent: Jun. 20, 2017

(54) AIR-CONDITIONING APPARATUS

(75) Inventors: Keisuke Takayama, Tokyo (JP);
Osamu Morimoto, Tokyo (JP);
Daisuke Shimamoto, Tokyo (JP); So Nomoto, Tokyo (JP); Kosuke Tanaka, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 366 days.

(21) Appl. No.: 14/386,140

(22) PCT Filed: Mar. 27, 2012

(86) PCT No.: PCT/JP2012/002100
§ 371 (c)(1),
(2), (4) Date: Sep. 18, 2014

(87) PCT Pub. No.: WO2013/144996
PCT Pub. Date: Oct. 3, 2013

(65) Prior Publication Data
US 2015/0059380 A1 Mar. 5, 2015

(51) Int. Cl.
*F25B 49/02* (2006.01)
*F25B 41/04* (2006.01)
(Continued)

(52) U.S. Cl.
CPC ............ *F25B 49/022* (2013.01); *F25B 13/00* (2013.01); *F25B 41/043* (2013.01); *F25B 25/005* (2013.01);
(Continued)

(58) Field of Classification Search
CPC ...... F25B 49/022; F25B 41/043; F25B 13/00; F25B 2313/02741; F25B 2313/0233;
(Continued)

(56) References Cited

U.S. PATENT DOCUMENTS 4,523,435 A * 6/1985 Lord ..................... F25B 41/062
236/78 D
5,737,931 A * 4/1998 Ueno ...................... F25B 9/006
62/126
(Continued)

FOREIGN PATENT DOCUMENTS

BE WO 2011080801 A1 * 7/2011 ................ F25B 7/00
EP 0 282 772 A2 9/1988
(Continued)

OTHER PUBLICATIONS

International Search Report of the International Searching Authority mailed May 22, 2012 for the corresponding international application No. PCT/JP2012/002100 (and English translation).
(Continued)

*Primary Examiner* — Jianying Atkisson
*Assistant Examiner* — Kun Kai Ma
(74) *Attorney, Agent, or Firm* — Posz Law Group, PLC

(57) ABSTRACT

An air-conditioning apparatus includes a compressor, an indoor heat exchanger configured to function as a condenser or an evaporator, indoor heat exchanges each configured to function as a condenser or an evaporator, a plurality of expansion valves each provided for a corresponding one of the indoor heat exchangers each configured to adjust a flow rate of a refrigerant that flows through the corresponding indoor heat exchanger, and a controller configured to control an operation capacity of the compressor and opening degrees of a plurality of expansion devices. When increasing heat exchange performance of the indoor heat exchanger, the controller increases the operation capacity of the compressor and controls the opening degree of the expansion valve corresponding to the indoor heat exchanger to decrease the flow rate of the refrigerant that flows through the indoor heat exchanger.

11 Claims, 10 Drawing Sheets

(51) Int. Cl.
*F25B 13/00* (2006.01)
*F25B 25/00* (2006.01)

(52) U.S. Cl.
CPC .............. *F25B 2313/0231* (2013.01); *F25B 2313/0233* (2013.01); *F25B 2313/0272* (2013.01); *F25B 2313/02732* (2013.01); *F25B 2313/02741* (2013.01); *F25B 2600/021* (2013.01); *F25B 2600/2513* (2013.01); *Y02B 30/741* (2013.01)

(58) Field of Classification Search
CPC .............. F25B 25/005; F25B 2600/021; F25B 2313/0272; F25B 2313/0231
See application file for complete search history.

(56) References Cited

U.S. PATENT DOCUMENTS

| | | | | |
|---|---|---|---|---|
| 5,987,914 | A * | 11/1999 | Sumida | C10M 171/008 62/468 |
| 2004/0079096 | A1* | 4/2004 | Itoh | B60H 1/00735 62/223 |
| 2006/0059929 | A1* | 3/2006 | Sakitani | F25B 9/06 62/228.1 |
| 2008/0229769 | A1* | 9/2008 | Takegami | F25B 13/00 62/175 |
| 2008/0282718 | A1* | 11/2008 | Beagle | F25B 49/025 62/228.4 |
| 2010/0211228 | A1* | 8/2010 | Chao | F25B 49/027 700/282 |
| 2011/0000240 | A1* | 1/2011 | Yamada | F25B 49/005 62/208 |
| 2011/0023534 | A1* | 2/2011 | Kasahara | F25B 13/00 62/498 |
| 2011/0113800 | A1* | 5/2011 | Sekiya | B60H 1/00278 62/151 |
| 2012/0285186 | A1* | 11/2012 | Honda | F25B 7/00 62/126 |
| 2012/0291468 | A1* | 11/2012 | Kato | F24F 3/06 62/185 |
| 2012/0291472 | A1* | 11/2012 | Morimoto | F24F 1/26 62/324.6 |
| 2013/0299129 | A1* | 11/2013 | Osaka | B60H 1/0005 165/59 |

FOREIGN PATENT DOCUMENTS

| | | |
|---|---|---|
| EP | 1 091 178 A2 | 4/2001 |
| JP | S62-102046 A | 5/1987 |
| JP | H02-126044 A | 5/1990 |
| JP | H04-76359 A | 3/1992 |
| JP | H04-316964 A | 11/1992 |
| JP | H08-28985 A | 2/1996 |
| JP | H08-261599 A | 10/1996 |
| JP | 2002-206788 A | 7/2002 |
| JP | 2007-271112 A | 10/2007 |
| JP | WO 2011064827 A1 * | 6/2011 ............... F24F 1/26 |
| JP | WO 2011104827 A1 * | 9/2011 ............... F24F 3/06 |
| WO | 2011/064830 A1 | 6/2011 |

OTHER PUBLICATIONS

Extended European Search Report dated Apr. 25, 2016 issued in the corresponding European patent application No. 12872329.3.

* cited by examiner

← FLOW OF REFRIGERANT DURING HEATING OPERATION
←-- FLOW OF REFRIGERANT DURING COOLING OPERATION

F I G. 8
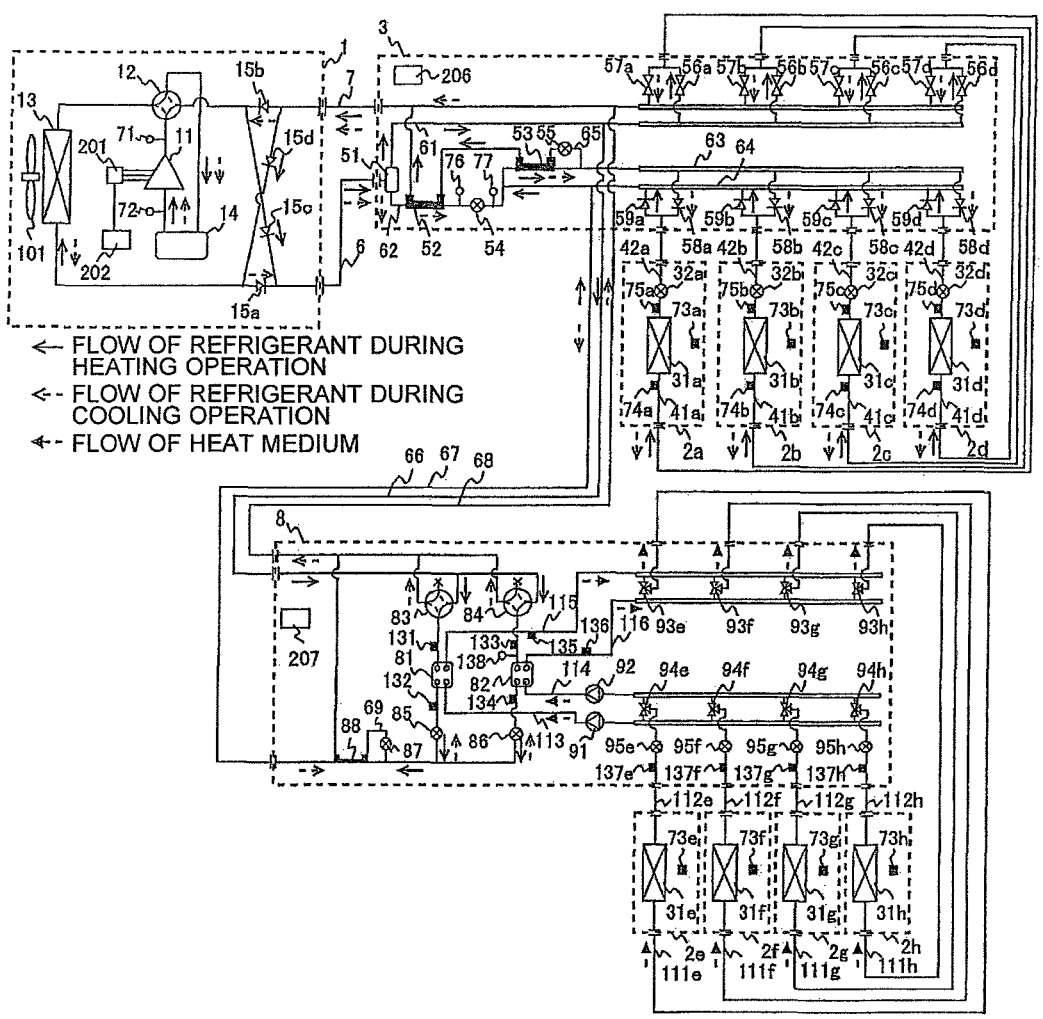

AIR-CONDITIONING APPARATUS

CROSS REFERENCE TO RELATED APPLICATION

This application is a U.S. national stage application of International Application No. PCT/JP2012/002100 filed on Mar. 27, 2012, and the contents of which are incorporated by reference.

TECHNICAL FIELD

The present invention relates to a multi-room air-conditioning apparatus used as, for example, a multi-air-conditioning apparatus for a building or the like.

BACKGROUND ART

Generally used air-conditioning apparatuses having a multi-room heat-pump refrigeration cycle circuit include an outdoor unit including a compressor, a four-way valve, and an outdoor heat exchanger, and a plurality of indoor units each including an expansion valve and an indoor heat exchanger. These components sequentially communicate with one another through refrigerant pipes, and form a heat-pump refrigeration cycle. Specifically, the indoor units have a parallel configuration, and form a predetermined refrigeration cycle circuit by switching between a cooling operation and a heating operation.

Such multi-room air-conditioning apparatuses adjust a flow rate of the refrigerant in the entire refrigeration cycle circuit by adjusting an operation capacity of the compressor using a condensing temperature of the indoor heat exchangers as a target value in the case of the heating operation. Also, each of the indoor units adjusts a flow rate of the refrigerant in the indoor heat exchanger by adjusting an opening degree of the expansion valve using a degree of subcooling of the indoor heat exchanger as a target value. That is, a capacity of the indoor heat exchanger is designed such that a predetermined heating performance is achieved for a load of the indoor unit by adjusting a condensing pressure and a degree of subcooling within predetermined ranges in the case of the heating operation. In the case of the cooling operation, an evaporating pressure and a degree of superheat are adjusted within ranges determined in a predetermined extent.

In addition, as for air-conditioning apparatuses including a plurality of indoor units installed in the same room, there has been proposed an air-conditioning apparatus that performs an air-conditioning performance saving operation in any of the indoor units in the case where a detected air-conditioning load of a refrigerant circuit is larger than a heating performance rating preset for the refrigerant circuit (see, for example, Patent Literature 1). This air-conditioning apparatus determines whether a capacity of a compressor has reached the maximum capacity during the heating operation. Upon determining that the capacity of the compressor has reached the maximum value, the air-conditioning apparatus determines whether the performance of the entire system is sufficient or not for a heating load on the basis of a value obtained by subtracting a calculated high-pressure saturation temperature from a high-pressure saturation temperature target value. If the performance of the entire system seems to be insufficient, the air-conditioning apparatus changes a set degree-of-subcooling target value to a larger value in the order of ascending priority to perform a heating performance saving operation. In the case of the cooling operation, a set degree-of-superheat target value is changed to a larger value.

Also, as an air-conditioning apparatus capable of performing a simultaneous cooling and heating operation, there has been proposed an air-conditioning apparatus in which a water temperature adjusting unit capable of heating water used is connected to an air-conditioning heat source unit in parallel with indoor units (see, for example, Patent Literature 2). In the case of simultaneously performing heating and a water heating operation, this air-conditioning apparatus determines that air-conditioning-side performance is insufficient when detecting that a high pressure has become a pressure lower than a preset certain pressure. The air-conditioning apparatus performs control for prioritizing indoor air-conditioning by reducing an opening degree of a water use side refrigerant flow control device to a predetermined minimum opening degree. Also, when detecting a high pressure higher than the predetermined pressure, the air-conditioning apparatus enables a water heating operation to be performed at the same time as indoor air-conditioning by increasing the opening degree of the water use side refrigerant flow control device to a predetermined opening degree.

CITATION LIST

Patent Literature

Patent Literature 1: Japanese Unexamined Patent Application Publication No. 2007-271112
Patent Literature 2: Japanese Unexamined Patent Application Publication No. 8-261599

SUMMARY OF INVENTION

Technical Problem

In the conventional air-conditioning apparatus described in Patent Literature 1, when the condensing temperature (high-pressure saturation temperature) of an indoor unit is lower than the target value, control is performed such that the condensing temperature becomes closer to the target value by decreasing the flow rate of the refrigerant in an indoor unit assigned low priority. With this control, an indoor unit assigned high priority becomes able to achieve the air-conditioning performance set before the control; however, the control does not increase the air-conditioning performance of the indoor unit assigned high priority. Also, in the conventional air-conditioning apparatus described in Patent Literature 2, when the condensing temperature (high pressure) is smaller than a predetermined pressure, control is performed such that the condensing temperature becomes closer to the predetermined pressure by decreasing the flow rate of the refrigerant in a water temperature adjusting device assigned with low priority. Like the control disclosed in Patent Literature 1, this control also allows an indoor unit assigned high priority to achieve the air-conditioning performance set before the control; however, the control does not increase the air-conditioning performance of the indoor unit assigned high priority.

That is, in the conventional air-conditioning apparatuses, air-conditioning performance of an indoor unit assigned high priority is maintained by adjusting a pressure reducing device that controls the flow rate of the refrigerant in an indoor unit assigned low priority; however, there is a following problem: the air-conditioning performance of the indoor unit assigned high priority cannot be increased by merely adjusting the pressure reducing device.

In other words, in the conventional air-conditioning apparatuses, heat exchange performance of a use side heat exchanger assigned high priority is maintained by adjusting a pressure reducing device that controls the flow rate of the refrigerant in a use side heat exchanger assigned low priority; however, there is a following problem: the heat exchange performance of the use side heat exchanger assigned high priority cannot be increased by merely adjusting the pressure reducing device.

Also, there have hitherto been proposed air-conditioning apparatuses including a plurality of intermediate heat exchangers that allow heat exchange between, for example, a refrigerant and a heat medium such as water and heat or cool the heat medium, and indirect indoor heat exchangers each of which circulates the heat medium therethrough to heat or cool an indoor space. Some of such air-conditioning apparatuses are capable of performing a water-cooling and water-heating mixed mode by causing some of the intermediate heat exchangers to function as condensers and causing some of the rest to function as evaporators. The conventional air-conditioning apparatuses capable of performing this water-cooling and water-heating mixed mode is designed such that the performance required in the case where all the indirect indoor heat exchangers are used for a heating operation is achieved when all the intermediate heat exchangers function as condensers. For this reason, in the case where the conventional air-conditioning apparatuses capable of performing the water-cooling and water-heating mixed mode operate in the water-cooling and water-heating mixed mode, when a heating load of indirect indoor units containing the indirect indoor heat exchangers is sufficiently large, a heat transfer area of the intermediate heat exchangers that function as condensers is small for the heating load. Thus, there is a following problem: the heat medium cannot be sufficiently heated for the heating load by merely adjusting the condensing temperature to a predetermined range and adjusting an expansion device. Also, there is a following problem: a flow rate of the heat medium sent out by a pump that sends out the heat medium related to heating becomes insufficient and the heating performance of the indirect indoor units decreases.

The present invention has been made to solve at least one of the above-described problems, and aims to obtain an air-conditioning apparatus capable of increasing, in the case of performing operation by prioritizing heat exchange performance of at least one of use side heat exchangers, the heat exchange performance of the use side heat exchanger.

Solution to Problem

An air-conditioning apparatus according to the present invention includes a compressor, a heat source side heat exchanger configured to function as a condenser or an evaporator, a plurality of use side heat exchangers each configured to function as a condenser or an evaporator, a plurality of expansion devices each provided for a corresponding one of the use side heat exchangers, and each configured to adjust a flow rate of a refrigerant that flows through the corresponding use side heat exchanger, and a controller configured to control an operation capacity of the compressor and opening degrees of the plurality of expansion devices, wherein when increasing heat exchange performance of at least one, but not all, of the plurality of use side heat exchangers (hereinafter, the use-side heat exchanger whose heat exchange performance is increased is referred to as a first use side heat exchanger), the controller increases the operation capacity of the compressor, and controls the opening degree of the expansion device corresponding to at least one (hereinafter, referred to as a second use side heat exchanger) of the use side heat exchangers that perform a function identical to a function of the first use side heat exchanger, to decrease a flow rate of the refrigerant that flows through the second use side heat exchanger, the second use side heat exchanger being different from the first use side heat exchanger.

Advantageous Effects of Invention

In the case of increasing the heat exchange performance of the first use side heat exchanger, the air-conditioning apparatus according to the present invention increases the operation capacity of the compressor and decreases the flow rate of the refrigerant in the second use side heat exchanger. Accordingly, for example, in the case where the first use side heat exchanger is used for heating, the condensing saturation temperature of the refrigerant that flows through the first use side heat exchanger can be increased, and for example, in the case where the first use side heat exchanger is used for cooling, the evaporating saturation temperature of the refrigerant that flows through the first use side heat exchanger can be decreased. Also, at this time, it is possible to prevent heat exchange performance of the second heat exchanger from becoming excessive. Accordingly, when operation is performed by prioritizing the heat exchange performance of the first use side heat exchanger, the heat exchange performance of the first use side heat exchanger can be increased.

BRIEF DESCRIPTION OF DRAWINGS

FIG. 8 is a refrigerant circuit diagram of an air-conditioning apparatus according to Embodiment 3 of the present invention.

DESCRIPTION OF EMBODIMENTS

Embodiment 1

Figure 1:
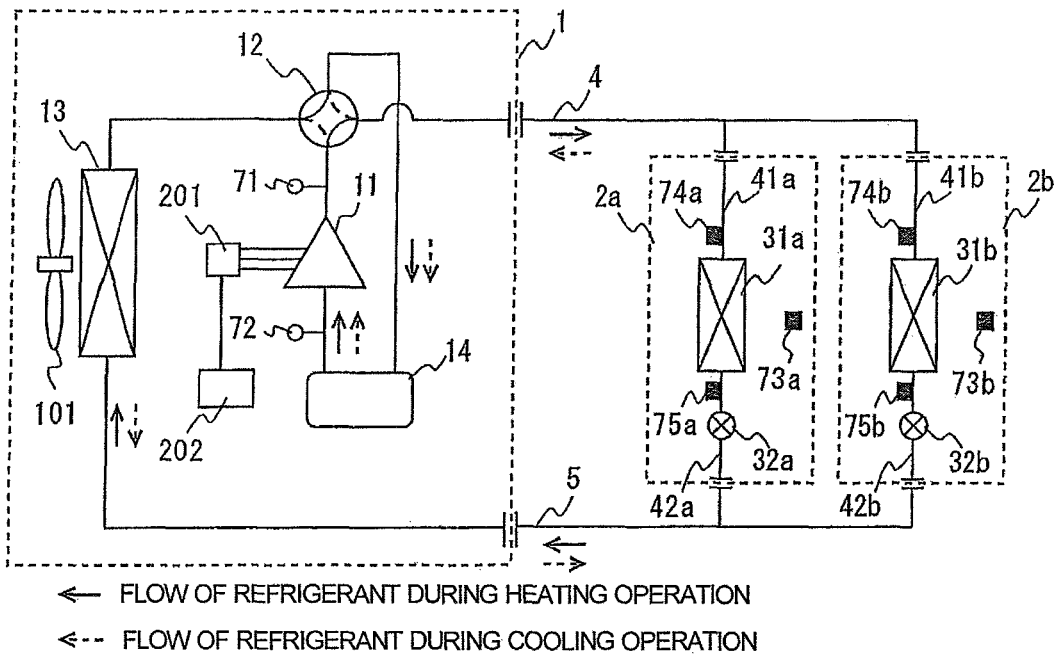
FIG. 1 is a refrigerant circuit diagram of an air-conditioning apparatus according to Embodiment 1 of the present invention.

FIG. 1 is a refrigerant circuit diagram of an air-conditioning apparatus according to Embodiment 1 of the present invention. Note that, in the following description, an alphabetical character may be appended to the end of a reference sign in the case where components having the same configuration have to be distinguished from one another or the like. The air-conditioning apparatus according to Embodiment 1 includes a compressor 11, a four-way valve 12 serving as a refrigerant flow switching device, an outdoor heat exchanger 13 serving as a heat source side heat exchanger, an accumulator 14, a plurality of indoor heat exchangers 31 serving as use side heat exchangers, a plurality of expansion valves 32 (expansion devices) each provided for a corresponding one of the indoor heat exchangers 31, which are connected by pipes to form a refrigeration cycle circuit.

Specifically, the compressor 11 is configured to compress a sucked refrigerant and discharge (send out) the compressed refrigerant. The four-way valve 12 serving as a refrigerant flow switching device is provided at a discharge side of the compressor 11 and is configured to switch a passage of the refrigerant. Note that the four-way valve 12 performs valve switching based on operation modes related to cooling and heating in accordance with an instruction from an outdoor controller 202 which will be described later. In Embodiment 1, the refrigerant passage is switched depending on a cooling operation and a heating operation.

The outdoor heat exchanger 13 includes, for example, heat transfer pipes allowing the refrigerant to pass therethrough, a fin (not illustrated) for increasing a heat transfer area between the refrigerant flowing through the heat transfer pipes and outside air, and a fan 101 that transports air. The outdoor heat exchanger 13 allows heat exchange between the refrigerant and air (outside air). For example, the outdoor heat exchanger 13 functions as an evaporator during a heating operation to evaporate and gasify (vaporize) the refrigerant. On the other hand, during a cooling operation, the outdoor heat exchanger 13 functions as a condenser or gas cooler (hereinafter, referred to as a condenser) to condense and liquefy the refrigerant. In some circumstances, the outdoor heat exchanger 13 makes the refrigerant into a two-phase mixture of liquid and gas (two-phase gas-liquid refrigerant) instead of completely gasifying or liquefying the refrigerant.

The indoor heat exchanger 31 includes, for example, heat transfer pipes allowing the refrigerant to pass therethrough, a fin (not illustrated) for increasing a heat transfer area between the refrigerant flowing through the heat transfer pipes and outside air, and a fan (not illustrated) that transports air. The indoor heat exchanger 31 allows heat exchange between the refrigerant and air (indoor). For example, the indoor heat exchanger 31 functions as a condenser or gas cooler (hereinafter, referred to as a condenser) during a heating operation to condense and liquefy the refrigerant. On the other hand, during a cooling operation, the indoor heat exchanger 31 functions as an evaporator to evaporate and gasify (vaporize) the refrigerant. In some circumstances, the indoor heat exchanger 31 makes the refrigerant into a two-phase mixture of liquid and gas (two-phase gas-liquid refrigerant) instead of completely gasifying or liquefying the refrigerant.

The expansion valve 32, for example, an electronic expansion value or the like, reduces the pressure of the refrigerant by adjusting the flow rate of the refrigerant. The accumulator 14 has functions for storing excessive refrigerant within the refrigeration cycle circuit and for preventing a large amount of liquid refrigerant from returning to the compressor 11 to damage the compressor 11.

This refrigeration cycle circuit also includes various pressure sensors and temperature sensors.

A pressure sensor 71 serving as refrigerant pressure detecting means is installed between the discharge side of the compressor 11 and the four-way valve 12, and detects a discharge pressure (pressure of the refrigerant discharged by the compressor 11). A pressure sensor 72 is installed between the accumulator 14 and the compressor 11, and detects a suction pressure (pressure of the refrigerant sucked by the compressor 11). Positions of the pressure sensor 71 and the pressure sensor 72 are not limited to these ones as long as the discharge pressure and the suction pressure of the compressor 11 are detectable, respectively. Each of temperature sensors 74 serving as refrigerant temperature detecting means is installed at a corresponding gas branch pipe 41 that connects the four-way valve 12 and the corresponding indoor heat exchanger 31 to each other, and detects a temperature at a gas side of the indoor heat exchanger 31. Each of temperature sensors 75 is installed between the corresponding indoor heat exchanger 31 and the corresponding expansion valve 32 of a corresponding indoor unit, and detects a temperature at a liquid side of the indoor heat exchanger 31. Each of temperature sensors 73 detects a temperature of air sucked by the corresponding indoor heat exchanger 31 (in other words, a corresponding indoor unit 2).

In Embodiment 1, the compressor 11, the four-way valve 12, the outdoor heat exchanger 13, and the accumulator 14 are included in an outdoor unit 1 serving as a heat source unit. The indoor heat exchanger 31 and the expansion valve 32 are included in each indoor unit 2. The indoor units 2 are connected to the outdoor unit 1 in parallel with one another by a gas pipe 4, the respective gas branch pipes 41, a liquid pipe 5, and respective liquid branch pipes 42 which are refrigerant pipes.

FIG. 1 illustrates the case where there are two indoor units 2; however, the number of indoor units 2 may be two or more.

The outdoor unit 1 also includes the outdoor controller 202 that administrates control of the outdoor unit 1 and control of the entire air-conditioning apparatus. Also, each of these indoor units 2 includes an indoor controller 203 that controls the indoor unit (see FIG. 2 described later).

Here, the outdoor controller 202 and the indoor controllers 203 correspond to a controller of the present invention. In Embodiment 1, the controller is split into the outdoor controller 202 and the indoor controllers 203; however, these may be integrally configured, of course.

Figure 2:
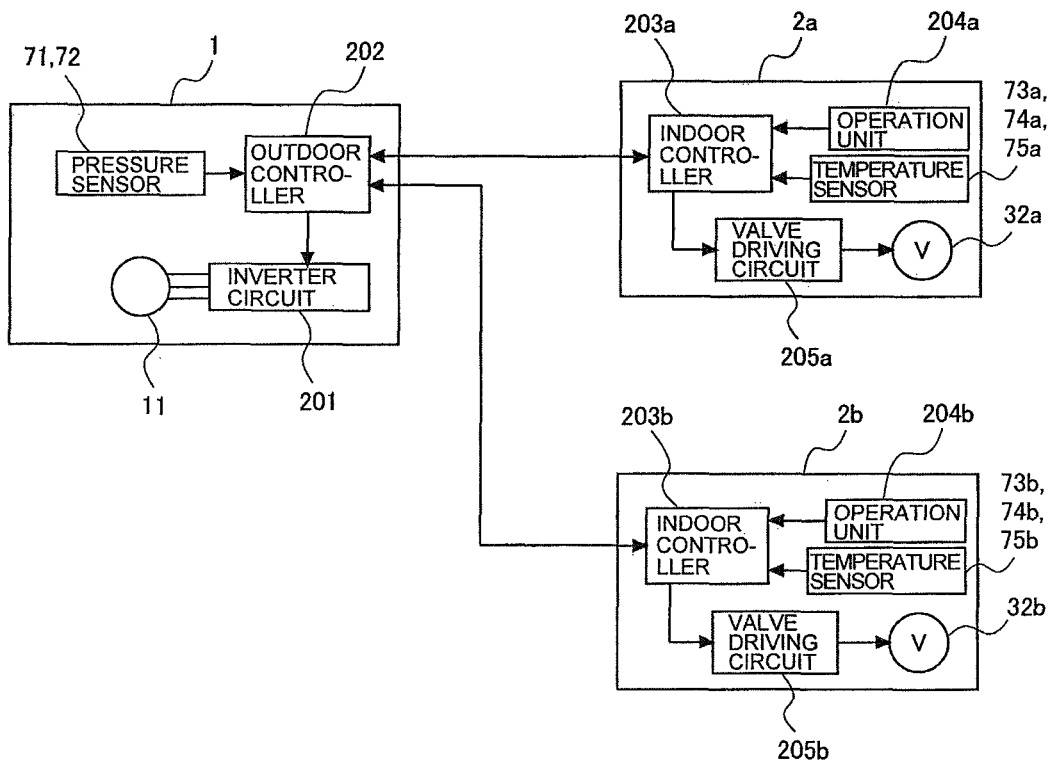
FIG. 2 is a control circuit diagram of the air-conditioning apparatus according to Embodiment 1 of the present invention.

FIG. 2 is a control circuit diagram of the air-conditioning apparatus according to Embodiment 1 of the present invention. As illustrated in FIG. 2, an inverter circuit 201 is connected to the outdoor controller 202. This outdoor controller 202 includes a microcomputer and peripheral circuits of the microcomputer. Also, the inverter circuit 201 is configured to output an alternating-current power of an operation frequency (and voltage) corresponding to a command from the outdoor controller 202 to a motor of the compressor 11. Note that the outdoor controller 202 determines the operation frequency (that is, the rotation speed of the compressor 11) of a command given to the inverter circuit 201, in accordance with detected pressures detected by the pressure sensors 71 and 72. Details about this determination method will be described later.

To each of the indoor controllers 203 is connected a valve driving circuit 205. This indoor controller 203 includes a microcomputer and peripheral circuits of the microcomputer, and is supplied with various control commands in form of serial signals from the outdoor controller 202. Also, the valve driving circuit 205 is configured to set the opening degree of the expansion valve 32 in accordance with a command from the corresponding indoor controller 203. The indoor controller 203 determines the opening degree of the expansion valve 32 in accordance with content of a request from an operation unit 204 and temperatures detected by the temperature sensors 73 to 75. Details regarding this determination method will be described later.

Examples of the refrigerant used in the air-conditioning apparatus configured in the above-described manner include a single-component refrigerant, such as R-22 or R-134a; a near-azeotropic refrigerant mixture, such as R-410A or R-404A; a non-azeotropic refrigerant mixture, such as R-407C; a refrigerant, such as $CF_3CF=CH_2$, including a double bond in its chemical formula and assumed to have a relatively small global warming potential or a mixture of the above; and a natural refrigerant, such as $CO_2$ or propane.

<Operation Modes>

Subsequently, an operation of the air-conditioning apparatus in each operation mode will be described based on the flow of the refrigerant. It is assumed here that high and low pressures in the refrigerant cycle circuit or the like is not determined based on a relationship with a reference pressure but rather the high pressure and the low pressure are expressed as relative pressures caused by compression by the compressor 11, the refrigerant flow rate control by the expansion valves 32, and so on. Also, the same applies to high and low temperatures.

(Heating Operation)

A heating operation in which the indoor units 2 heat indoor spaces will be described. During a heating operation, the refrigerant within the refrigeration cycle circuit flows as indicated by solid-line arrows in FIG. 1. Specifically, in the outdoor unit 1, the refrigerant sucked by the compressor 11 is compressed and discharged as high-pressure gas refrigerant. The refrigerant that has been discharged from the compressor 11 flows through the four-way valve 12 and through the gas pipe 4 and the respective gas branch pipes 41 into the individual indoor units 2.

The gas refrigerant that has flowed into the individual indoor units 2 flows into the respective indoor heat exchangers 31. Because the indoor heat exchangers 31 function as condensers for the refrigerant, the refrigerant that passes through the individual indoor heat exchangers 31 heats air serving as a heat exchange target and liquefies (transfers its heat to the air). In this way, indoor spaces are heated. Pressures of the resulting liquid refrigerant that has flowed out from the individual indoor heat exchangers 31 are reduced by the respective expansion valves 32, and the liquid refrigerant becomes low-temperature low-pressure two-phase gas-liquid refrigerant. The low-temperature low-pressure refrigerant flows out from the individual indoor units 2, and returns to the outdoor unit 1 through the respective liquid branch pipes 42 and the liquid pipe 5.

The refrigerant that has flowed into the outdoor unit 1 flows into the outdoor heat exchanger 13 where the refrigerant exchanges heat with air to evaporate, and flows out as gas refrigerant or two-phase gas-liquid refrigerant. The refrigerant that has evaporated is sucked by the compressor 11 again through the four-way valve 12 and the accumulator 14.

(Cooling Operation)

Subsequently, a cooling operation in which the indoor units 2 cool indoor spaces will be described. During a cooling operation, the refrigerant within the refrigeration cycle circuit flows as indicated by dashed-line arrows in FIG. 1. Specifically, in the outdoor unit 1, the refrigerant sucked by the compressor 11 is compressed and discharged as high-pressure gas refrigerant. The refrigerant that has been discharged from the compressor 11 flows through the four-way valve 12, and flows through the outdoor heat exchanger 13 that functions as a condenser. The high-pressure gas refrigerant exchanges heat with outside air transported by the fan 101 to condense while passing through the outdoor heat exchanger 13, flows out as high-pressure liquid refrigerant, and flows into the individual indoor units 2 through the liquid pipe 5 and the respective liquid branch pipes 42.

The refrigerant that has flowed into the individual indoor units 2 expands in response to adjustment of the opening degrees of the respective expansion valves 32, and the resulting low-temperature low-pressure two-phase gas-liquid refrigerant flows into the respective indoor heat exchangers 31. Because the indoor heat exchangers 31 function as evaporators for the refrigerant, the refrigerant that passes through the indoor heat exchangers 31 cools air serving as a heat exchange target (removes heat from the air), and flows out as gas refrigerant. In this way, indoor spaces are cooled. The gas refrigerant flows out from the indoor units 2, and returns to the outdoor unit 1 through the respective gas branch pipes 41 and the gas pipe 4. The refrigerant that has flowed into the outdoor unit 1 is sucked by the compressor 11 again through the four-way valve 12 and the accumulator 14.

<Actuator Control in Refrigerant Cycle Circuit>

Subsequently, a method for controlling various actuators provided in the refrigeration cycle circuit that is operated in the above-described manner will be described.

First, control of a capacity (that is, control of the rotation speed) of the compressor 11 will be described. The rotation speed of the compressor 11 is controlled in accordance with a command from the outdoor controller 202. Specifically, during a heating operation, the outdoor controller 202 controls the rotation speed of the compressor 11 such that the discharge pressure detected by the pressure sensor 71 becomes a predetermined target value so as to adjust the flow rate of the refrigerant in the entire refrigeration cycle. In other words, during a heating operation, the outdoor controller 202 controls the rotation speed of the compressor 11 such that a condensing saturation temperature (hereinafter, also simply referred to as a condensing temperature) of the refrigerant becomes a predetermined condensing saturation temperature target value so as to adjust the flow rate of the refrigerant in the entire refrigeration cycle. For example, the target discharge pressure value is set to approximately 50 degrees C. when being converted into the saturation temperature of the refrigerant. Also, during a cooling operation, the outdoor controller 202 controls the rotation speed of the compressor 11 such that the suction pressure detected by the pressure sensor 72 becomes a predetermined target value so as to adjust the flow rate of the refrigerant in the entire refrigeration cycle. In other words, during a cooling operation, the outdoor controller 202 controls the rotation speed of the compressor 11 such that an evaporating saturation temperature (hereinafter, also simply referred to as an evaporating temperature) of the refrigerant becomes a predetermined evaporating saturation temperature target value so as to adjust the flow rate of the refrigerant in the entire refrigerant cycle. For example, the target suction pressure value is set to approximately 0 degrees C. when being converted into the saturation temperature.

Next, control of the flow rate of the refrigerant in the indoor unit 2 will be described. The opening degree of the expansion valve 32 is controlled in accordance with a command from the indoor controller 203. Specifically, during a heating operation, the opening degree is controlled using the degree of subcooling of the indoor heat exchanger 31 as a target value so as to adjust the flow rate of the refrigerant that flows into the corresponding indoor unit 2. A method for calculating the degree of subcooling is as described below. The suction pressure detected by the pressure sensor 71 of the outdoor unit 1 is converted into the condensing temperature which is a saturation temperature by the outdoor controller 202, and the condensing temperature is transmitted to each indoor controller 203 of the corresponding indoor unit. The indoor controller 203 calculates the degree of subcooling from a difference between the condensing temperature and the liquid-side temperature of the refrigerant detected by the temperature sensor 75. At this time, it is desirable that the degree of subcooling be approximately 5 degrees. During a cooling operation, the opening degree is controlled using the degree of superheat of the indoor heat exchanger 31 as a target value so as to adjust the flow rate of the refrigerant that flows into the corresponding indoor unit 2. The degree of subcooling is calculated by the indoor controller 203 from a difference from the gas-side temperature of the refrigerant detected by the corresponding temperature sensor 74 and the liquid-side temperature of the refrigerant detected by the corresponding temperature sensor 75. At this time, it is desirable that the degree of superheat be approximately 3 degrees.

<Relationship between Indoor Load and Actuator Control in Refrigeration Cycle Circuit>

First, control of the condensing temperature (discharge pressure) and the evaporating temperature (suction pressure) will be described. During a heating operation, the condensing temperature of the refrigerant is controlled within a predetermined range, so that a predetermined heating performance can be achieved even in the case where the indoor units 2 have different heating loads as in a multi-room air-conditioning apparatus. During a cooling operation, the evaporating temperature of the refrigerant is controlled within a predetermined range, so that a predetermined cooling performance can be achieved even in the case where the indoor units 2 have different cooling loads.

Next, control of the degree of subcooling and the degree of superheat will be described. For example, suppose that the indoor unit 2 is performing a heating operation at a predetermined condensing temperature and a predetermined degree of subcooling. At this time, in response to a fall in the sucked air temperature of the indoor unit 2, that is, an increase in the load, the amount of heat exchange in the indoor heat exchanger 31 increases and a larger amount of refrigerant condenses if the opening degree of the expansion valve 32 is kept unchanged and the flow rate of the refrigerant in the indoor heat exchanger 31 is kept constant. Thus, the degree of subcooling increases. At this time, if the opening degree of the expansion valve 32 is increased, the flow rate of the refrigerant that condenses in the indoor heat exchanger 31 increases, and thus the degree of subcooling decreases and becomes closer to the target value. Also, the amount of heat exchange in the indoor heat exchanger 31 increases, and thus the heating performance of the indoor unit 2 can be further increased.

On the other hand, in response to a rise in the sucked air temperature of the indoor unit 2, that is, a decrease in the load, the amount of heat exchange in the indoor heat exchanger 31 decreases and a smaller amount of the refrigerant condenses. Thus, the degree of subcooling decreases. At this time, if the opening degree of the expansion valve 32 is decreased, the flow rate of the refrigerant that condenses in the indoor heat exchanger 31 decreases, and thus the degree of subcooling increases and becomes closer to the target value. Also, the amount of heat exchange in the indoor heat exchanger 31 decreases, and thus the heating performance of the indoor unit 2 can be further decreased.

As described above, a predetermined heating performance can be achieved for an indoor load by controlling the condensing temperature and the degree of subcooling.

During a cooling operation, when the sucked air temperature of the indoor unit 2 is high, that is, the load increases, the degree of superheat increases. When the sucked air temperature of the indoor unit 2 is low, that is, the load decreases, the degree of superheat decreases. Accordingly, a predetermined cooling performance can be achieved for an indoor load by controlling the evaporating temperature and the degree of superheat.

<Control Method for Increasing Heating Performance of at Least One of Indoor Units>

Now, a description will be given of a control method performed in response to a request to increase heating performance from at least one of the indoor units 2, that is, performed when heating performance of at least one of the indoor units 2 is increased. In Embodiment 1, heating performance of the indoor unit 2 that has made a request to increase heating performance is made higher than that of a designed capacity by making an operation capacity of the compressor 11 larger than the usual. At the same time, in the other indoor units 2, the flow rate of the refrigerant is suppressed and heating performance is prevented from becoming excessive. A flow of changing values of a condensing temperature target value Tcm and a degree-of-subcooling target value SCm in the case of increasing heating performance of the indoor unit 2b will be described by way of example in accordance with a flowchart of FIG. 3. Here, the indoor heat exchanger 31b corresponds to a first use side heat exchanger. The indoor heat exchanger 31a corresponds to a second use side heat exchanger.

Figure 3:
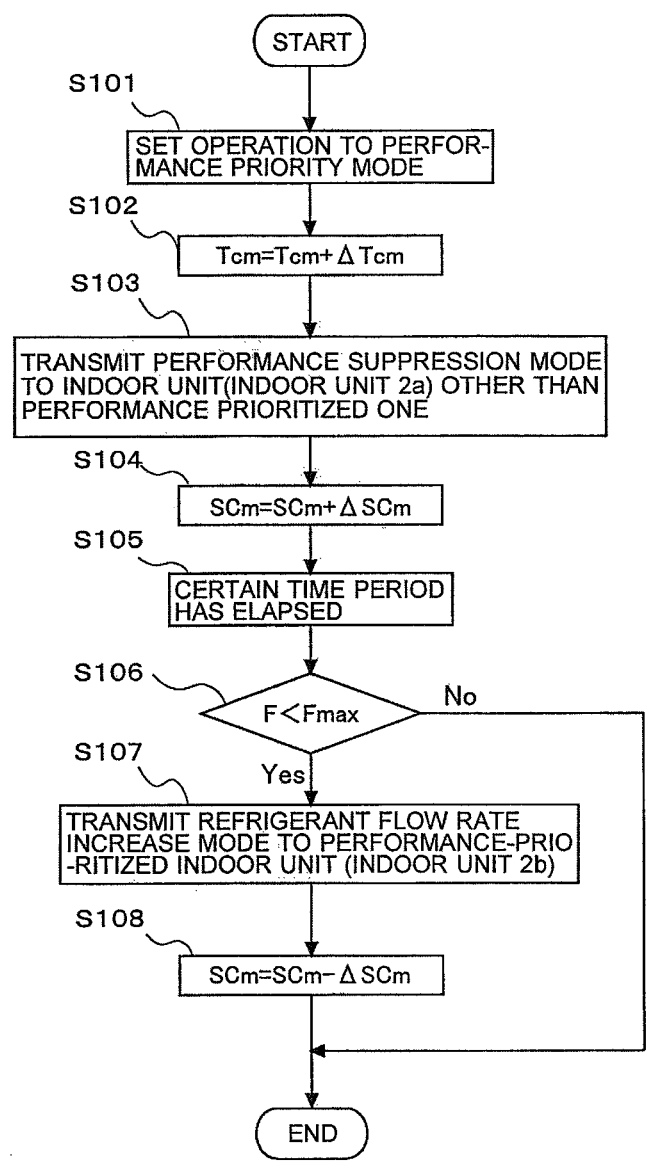
FIG. 3 is a flowchart illustrating control for increasing heating performance performed by the air-conditioning apparatus according to Embodiment 1 of the present invention.

FIG. 3 is a flowchart illustrating control for increasing heating performance of the air-conditioning apparatus according to Embodiment 1 of the present invention.

Upon receipt of a request to increase heating performance from the operation unit 204b of the indoor unit 2b, the indoor controller 203b transmits heating performance priority to the outdoor controller 202. Upon receipt of the heating performance priority, the outdoor controller 202 starts the flow of FIG. 3 and sets the operation mode of the air-conditioning apparatus to a performance priority mode (step S101). In step S102, the outdoor controller 202 increases the condensing temperature target value Tcm by ΔTcm. At this time, a rotation speed F of the compressor 11 is controlled based on a condensing temperature Tc. Accordingly, if the rotation speed F is smaller than the maximum rotation speed Fmax, the ration speed F of the compressor 11 increases when the condensing temperature target value Tcm increases.

In step S103, the outdoor controller 202 transmits a performance suppression mode to the indoor unit 2 (here, the indoor unit 2*a*) other than the performance-prioritized one. The indoor controller 203*a* of the indoor unit 2*a* that has received the performance suppression mode increases the degree-of-subcooling target value SCm of the indoor heat exchanger 31*a* by ΔSCm in step S104. At this time, an opening degree L of the expansion valve 32*a* is controlled based on a calculated degree of subcooling SC. Accordingly, the opening degree L decreases when the degree-of-subcooling target value SCm increases. That is, when the degree-of-subcooling target value SCm of the expansion valve 32*a* increases, the amount of refrigerant that flows through the indoor unit 2*a* (more specifically, the indoor heat exchanger 31*a*) decreases.

The operation state of the refrigeration cycle circuit changes in response to changes in the rotation speed F of the compressor 11 and the opening degree of the expansion valve 32*a*. Thus, the outdoor controller 202 allows a predetermined period to pass in step S105. This predetermined period is, for example, approximately 3 minutes to 5 minutes. In step S106, the outdoor controller 202 determines whether the rotation speed F of the compressor 11 is smaller than the maximum valve Fmax. If the rotation speed F is smaller than Fmax (Yes), the outdoor controller 202 transmits a refrigerant flow rate increase mode to the performance-prioritized indoor unit 2*b* in step S107. The indoor controller 203*b* that has received the refrigerant flow rate increase mode decreases the degree-of-subcooling target value SCm of the indoor heat exchanger 31*b* by ΔSCm in step S108. At this time, because the opening degree L of the expansion valve 32*b* is controlled based on the calculated degree of subcooling SC, the opening degree L increases when the degree-of-subcooling target value SCm decreases. That is, when the degree-of-subcooling target value SCm for the expansion valve 32*b* decreases, the amount of refrigerant that flows through the indoor unit 2*b* (more specifically, the indoor heat exchanger 31*b*) increases. At this point, the flow for changing the values of the condensing temperature target value Tcm and the degree-of-subcooling target value SCm ends; however, the resulting Tcm and SCm are maintained until the heating performance priority request is canceled by the operation unit 204*b* of the indoor unit 2*b*. If the rotation speed F is Fmax (No) in step S106, the flow ends.

<Effects of Control for Increasing Heating Performance>

As described above, in the air-conditioning apparatus configured as in Embodiment 1, because the condensing temperature target value Tcm is increased in step S102, the rotation speed F of the compressor 11 becomes higher than the rotation speed that allows a predetermined heating performance of the refrigeration cycle to be achieved. That is, because the flow rate of the refrigerant in the entire refrigerant cycle increases, the heating performance of the indoor heat exchanger 31 can be made larger than the predetermined performance.

Also, because the degree-of-subcooling target value SCm is increased in step S104 in the indoor heat exchanger 31*a* other than the performance-prioritized one, the opening degree L of the expansion valve 32*a* decreases. That is, because the flow rate of the refrigerant that flows through the indoor heat exchanger 31*a* decreases, an increase in the heating performance due to an increase in the rotation speed F of the compressor 11 can be suppressed in the indoor unit 2*a* other than the performance-prioritized one.

Also, in the case where the rotation speed F of the compressor 11 is increased by increasing the condensing temperature target value Tcm without changing the degree-of-subcooling target value SCm of each indoor heat exchanger 31, the heating performance of all the indoor heat exchangers 31 that are performing a heating operation increases and effects of the increase in the performance of the performance-prioritized indoor unit 2*b* becomes small. Accordingly, by increasing the degree-of-subcooling target value SCm in the indoor heat exchanger 31*a* other than the performance-prioritized one, effects of the increase in the performance of the performance-prioritized indoor unit 2*b* can be increased.

Also, in the performance-prioritized indoor heat exchanger 31*b*, because the degree-of-subcooling target value SCm is decreased in step S108, the opening degree L of the expansion valve 32*b* increases. That is, because the flow rate of the refrigerant that flows through the indoor heat exchanger 31*b* increases, the heating performance of the indoor unit 2*b* can be further increased.

Also, in the case where the rotation speed F of the compressor 11 is Fmax in step S102, the rotation speed F cannot be increased; however, even in this case, the heating performance of the performance-prioritized indoor unit 2*b* can be increased by decreasing the flow rate of the refrigerant that flows through the indoor heat exchanger 31*a* other than the performance-prioritized one in step S104 and by increasing the flow rate of the refrigerant that flows through the performance-prioritized indoor heat exchanger 31*b* in step S108. Note that the degree-of-subcooling target value SCm of the performance-prioritized indoor heat exchanger 31*b* is not changed because of the following reason in the case where the rotation speed F of the compressor 11 is Fmax in step S106. Specifically, if the flow rate of the refrigerant in the indoor heat exchanger 31*b* is increased by increasing the opening degree L of the expansion valve 32*b* in a state where the rotation speed F is Fmax, the condensing temperature Tc cannot be maintained at the condensing temperature target value Tcm and consequently the condensing temperature Tc drops. In order to prevent the drop in the condensing temperature Tc, the degree-of-subcooling target value SCm of the performance-prioritized indoor heat exchanger 31*b* is not changed in the case where the rotation speed F of the compressor 11 is Fmax in step S106.

In Embodiment 1, control for increasing heating performance of the indoor unit 2 has been described; however, control for increasing cooling performance may be performed. In this case, an evaporating temperature target value Tem may be decreased by ΔTem so as to make the rotation speed of the compressor 11 higher than the rotation speed that allows the refrigeration cycle to achieve a predetermined cooling performance. Also, as for the performance-prioritized indoor heat exchanger 31, a degree-of-superheat target value SHm of the indoor heat exchanger 31 may be decreased by ΔSHm so as to increase the flow rate of the refrigerant, and the degree of superheat target value SHm of the indoor heat exchanger 31 other than the performance-prioritized one may be increased by ΔSHm so as to decrease the flow rate of the refrigerant.

Embodiment 2

The air-conditioning apparatus described in Embodiment 1 is configured to select the same mode (either a heating operation or a cooling operation) as the operation mode of the individual indoor units 2. Not only this, the present invention can be carried out but also in an air-conditioning apparatus capable of selecting the operation mode separately each indoor unit, that is, an air-conditioning apparatus capable of performing a simultaneous cooling and heating operation. Note that, in Embodiment 2, components similar to those of Embodiment 1 are denoted by the same reference signs and points not particularly mentioned are similar to those of Embodiment 1.

Figure 4:
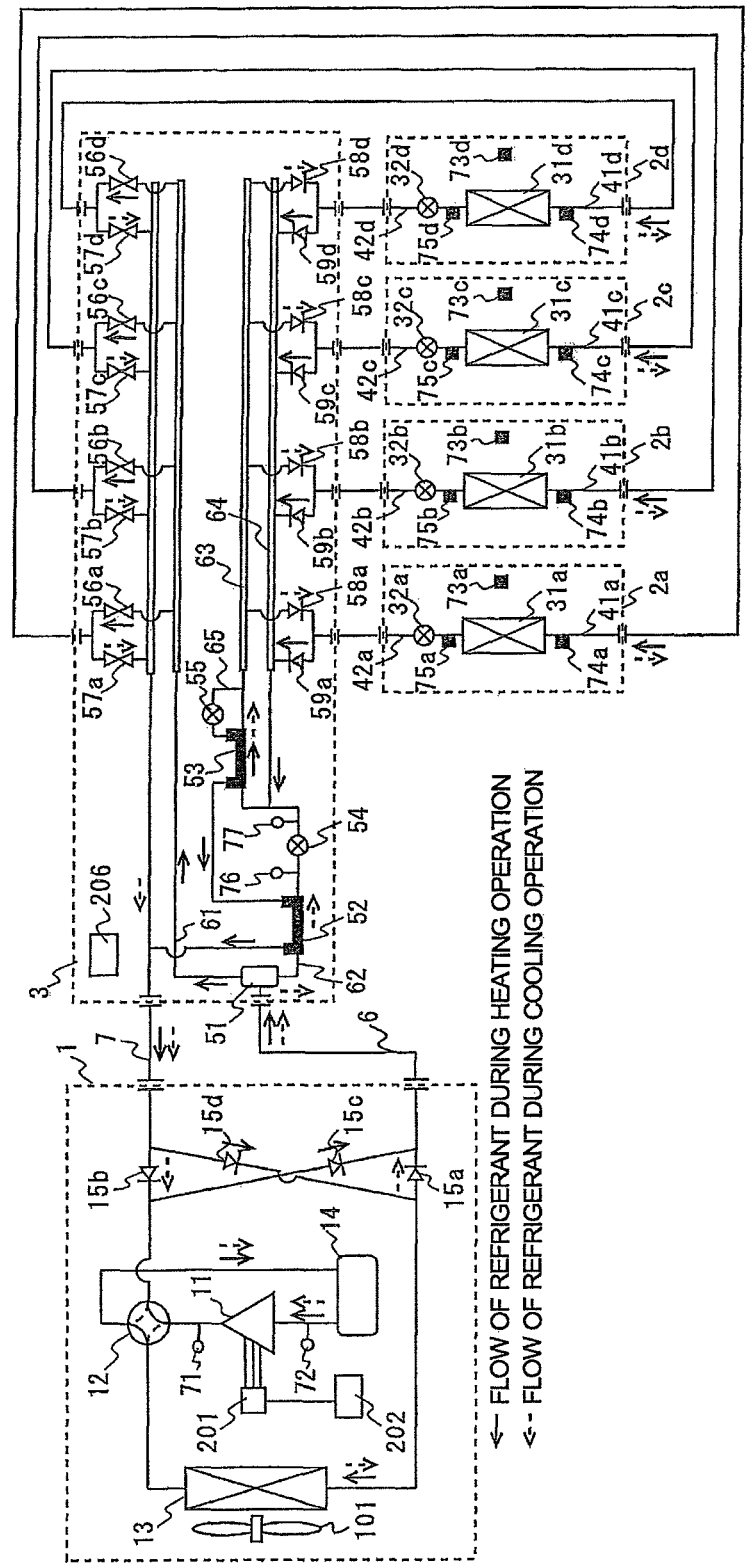
FIG. 4 is a refrigerant circuit diagram of an air-conditioning apparatus according to Embodiment 2 of the present invention.

FIG. 4 is a refrigerant circuit diagram of the air-conditioning apparatus according to Embodiment 2 of the present invention. In the air-conditioning apparatus according to Embodiment 2, the outside unit 1 includes check valves 15a, 15b, 15c, and 15d. Also, the air-conditioning apparatus according to Embodiment 2 includes a relay unit 3. This relay unit 3 includes a gas-liquid separator 51, internal heat exchangers 52 and 53, expansion valves 54 and 55, solenoid valves 56 and 57 serving as opening and closing devices, check valves 58 and 59, pressure sensors 76 and 77, and a relay unit controller 206. The relay unit 3 is connected to the outdoor unit 1 by a high-pressure pipe 6 and a low-pressure pipe 7 which are refrigerant pipes. The indoor units 2 are connected to the relay unit 3 in parallel with one another by the respective gas branch pipes 41 and the respective liquid branch pipes 42 which are refrigerant pipes. Note that there may be any given number of indoor units 2 and any given number of relay units 3.

The check valve 15a is provided between the outdoor heat exchanger 13 and the high-pressure pipe 6, and allows the refrigerant to pass only in a direction from the outdoor heat exchanger 13 to the high-pressure pipe 6. The check valve 15b is provided between the low-pressure pipe 7 and the four-way valve 12, and allows the refrigerant to pass only in a direction from the low-pressure pipe 7 to the four-way valve 12. The check valve 15c is provided between the four-way valve 12 and the high-pressure pipe 6, and allows the refrigerant to pass only in a direction from the four-way valve 12 to the high-pressure pipe 6. The check valve 15d is provided between the low-pressure pipe 7 and the outdoor heat exchanger 13, and allows the refrigerant to pass only in a direction from the low-pressure pipe 7 to the outdoor heat exchanger 13.

Each solenoid valve 56 and each solenoid valve 57 connect the corresponding gas branch pipe 41 of the corresponding indoor unit 2 to a high-pressure gas pipe 61 and the low-pressure pipe 7, respectively, in a switching manner. When the solenoid valve 56 is opened and the solenoid valve 57 is closed, the gas branch pipe 41 is connected to the high-pressure gas pipe 61. When the solenoid valve 57 is opened and the solenoid valve 56 is closed, the gas branch pipe 41 is connected to the low-pressure pipe 7.

One end of each check valve 58 and one end of each check valve 59 are connected to the corresponding liquid branch pipe 42 in a reverse-parallel relationship. The other end of each check valve 58 is connected to a liquid pipe 63, and allows the refrigerant to pass only in a direction from the liquid pipe 63 to the liquid branch pipe 42. The other end of each check valve 59 is connected to a liquid pipe 64, and allows the refrigerant to pass only in a direction from the liquid branch pipe 42 to the liquid pipe 64.

The gas-liquid separator 51 separates gas and liquid from each other when two-phase gas-liquid refrigerant flows therein from the high-pressure pipe 6, and allows the gas refrigerant to flow through the high-pressure pipe 61 and the liquid refrigerant through a liquid pipe 62.

The expansion valve 54 is provided between the gas-liquid separator 51 and the liquid pipes 63 and 64. A bypass pipe 65 connects the liquid pipe 63 and the low-pressure pipe 7 to each other. The expansion valve 55 is provided in the middle of the bypass pipe 65. The internal heat exchanger 53 allows heat exchange between a downstream portion of the expansion valve 55 of the bypass pipe 65 and a pipe that extends from the expansion valve 54 to the liquid pipe 63. On the other hand, the internal heat exchanger 52 allows heat exchange between a downstream portion of the internal heat exchanger 53 of the bypass pipe 65 and a pipe connecting the gas-liquid separator 51 to the expansion valve 54.

The relay unit controller 206 controls (gives commands for) opening degrees of the expansion valves 54 and 55 and opening and closing of the solenoid valves 56 and 57.

Also, the pressure sensor 76 serving as refrigerant pressure detecting means is configured to detect a high pressure. The pressure sensor 77 serving as refrigerant pressure detecting means is configured to detect an intermediate pressure (pressure between the high pressure and a low pressure).

<Operation Modes>

Subsequently, an operation of the air-conditioning apparatus in each operation mode will be described based on the flow of the refrigerant. In Embodiment 2, roughly four types of operation are performed. Specifically, the four types of operation are a heating only operation in which all the indoor units 2 perform a heating operation, a cooling only operation in which all the indoor units 2 perform a cooling operation, a heating main operation in which the indoor units 2 perform a cooling operation and a heating operation in a mixed manner and the capacity for the heating operation is larger, and a cooling main operation in which the capacity for a cooling operation is larger.

(Heating Only Operation)

Referring to FIG. 4, a heating only operation will be described. The flow of the refrigerant is represented by solid-line arrows in FIG. 4. In the outdoor unit 1, the refrigerant sucked by the compressor 11 is compressed and discharged as high-pressure gas refrigerant. The refrigerant that has been discharged from the compressor 11 flows through the four-way valve 12 and through the check valve 15c and the high-pressure pipe 6, and flows out from the outdoor unit 1. The refrigerant that has flowed into the relay unit 3 flows through the gas-liquid separator 51, the high-pressure gas pipe 61, the solenoid valves 56, and the gas branch pipes 41, and flows into the individual indoor units 2.

The gas refrigerant that has flowed into the individual indoor units 2 flows into the respective indoor heat exchangers 31 and heats air. Pressures of the liquid refrigerant that has flowed out from the respective indoor heat exchangers 31 is reduced to an intermediate pressure by the respective expansion valves 32, and the liquid refrigerant becomes intermediate-pressure liquid refrigerant. The intermediate-pressure liquid refrigerant flows out from the individual indoor units 2, flows through the respective liquid branch pipes 42 and the respective check valves 59, and then the individual streams of the refrigerant join together at the liquid pipe 64. From this point, the liquid refrigerant enters the bypass pipe 65 through the internal heat exchanger 53, and flows into the expansion valve 55 where the pressure of the liquid refrigerant is reduced so that the refrigerant enters a low-temperature low-pressure two-phase gas-liquid state. The pressure-reduced refrigerant flows through the bypass pipe 65, the internal heat exchanger 53, and the internal heat exchanger 52, and then returns to the outdoor unit 1 through the low-pressure pipe 7.

The refrigerant that has flowed into the outdoor unit 1 flows through the check valve 15d into the outdoor heat exchanger 13 where the refrigerant exchanges heat with air to evaporate, and flows out as gas refrigerant or two-phase gas-liquid refrigerant. The refrigerant that has evaporated is sucked by the compressor 11 again through the four-way valve 12 and the accumulator 14.

At this time, pressure at the high-pressure pipe 6 is high, pressure at the outdoor heat exchanger 13 is low, pressure at a portion between the compressor 11 and the check valve 15b is high, and pressure at the low-pressure pipe 7 is low. Accordingly, the refrigerant does not flow through the check valves 15a and 15b. Also, the solenoid valves 57 are closed.

(Cooling Only Operation)

Referring to FIG. 4, a cooling operation will be described. The flow of the refrigerant is represented by dashed-line arrows in FIG. 4. In the outdoor unit 1, the refrigerant sucked by the compressor 11 is compressed and discharged as high-pressure gas refrigerant. The refrigerant that has been discharged from the compressor 11 flows through the four-way valve 12 into the outdoor heat exchanger 13 that functions as a condenser, where the refrigerant condenses, and flows out as high-pressure liquid refrigerant. The refrigerant then flows through the check valve 15a and the high-pressure pipe 6, and flows out from the outdoor unit 1. The refrigerant that has flowed into the relay unit 3 flows sequentially through the gas-liquid separator 51, the liquid pipe 62, the internal heat exchanger 52, the expansion valve 54, and the internal heat exchanger 53, and branches at the liquid pipe 63. The resulting refrigerant flows through the check valves 58 and the liquid branch pipes 42, and flows into the individual indoor units 2.

The refrigerant that has flowed into the individual indoor units 2 expands in response to adjustment of the opening degrees of the respective expansion valves 32, and the resulting low-temperature low-pressure two-phase gas-liquid refrigerant flows into the respective indoor heat exchangers 31 and cools air. The gas refrigerant flows out from the individual indoor unit 2, flows through the gas branch pipes 41 and the solenoid valves 57, and the individual streams of the refrigerant join together. The refrigerant then passes through the low-pressure pipe 7, and returns to the outdoor unit 1. The refrigerant that has flowed into the outdoor unit 1 is sucked by the compressor 11 again through the check valve 15b, the four-way valve 12, and the accumulator 14.

At this time, pressure at the high-pressure pipe 6 is high, pressure at a portion between the compressor 11 and the check valve 15c is low, pressure at a portion between the outdoor heat exchanger 13 and the check valve 15d is high, and pressure at the low-pressure pipe 7 is low. Accordingly, the refrigerant does not flow through the check valves 15c and 15d. Also, the solenoid valves 56 are closed. Also, during this cycle, part of the refrigerant that has passed through the expansion valve 54 flows into the bypass pipe 65, and the pressure thereof is reduced by the expansion valve 55, and heat thereof is exchanged with the refrigerant flowing from the liquid pipe 63 into the individual indoor unit 2 at the internal heat exchanger 53. The refrigerant further exchanges heat with the refrigerant that flows into the expansion valve 54 at the internal heat exchanger 52. The refrigerant that has evaporated as a result of heat exchange performed at the internal heat exchanger 52 joins, at the low-pressure pipe 7, the refrigerant that has cooled air in the indoor units 2, and returns to the outdoor unit 1. On the other hand, the refrigerant that has been cooled through heat exchange performed at the internal heat exchanger 52 and the internal heat exchanger 53 and has a sufficient degree of subcooling flows into the indoor units 2 through the check valves 58 and the liquid branch pipes 42.

(Heating Main Operation)

Figure 5:
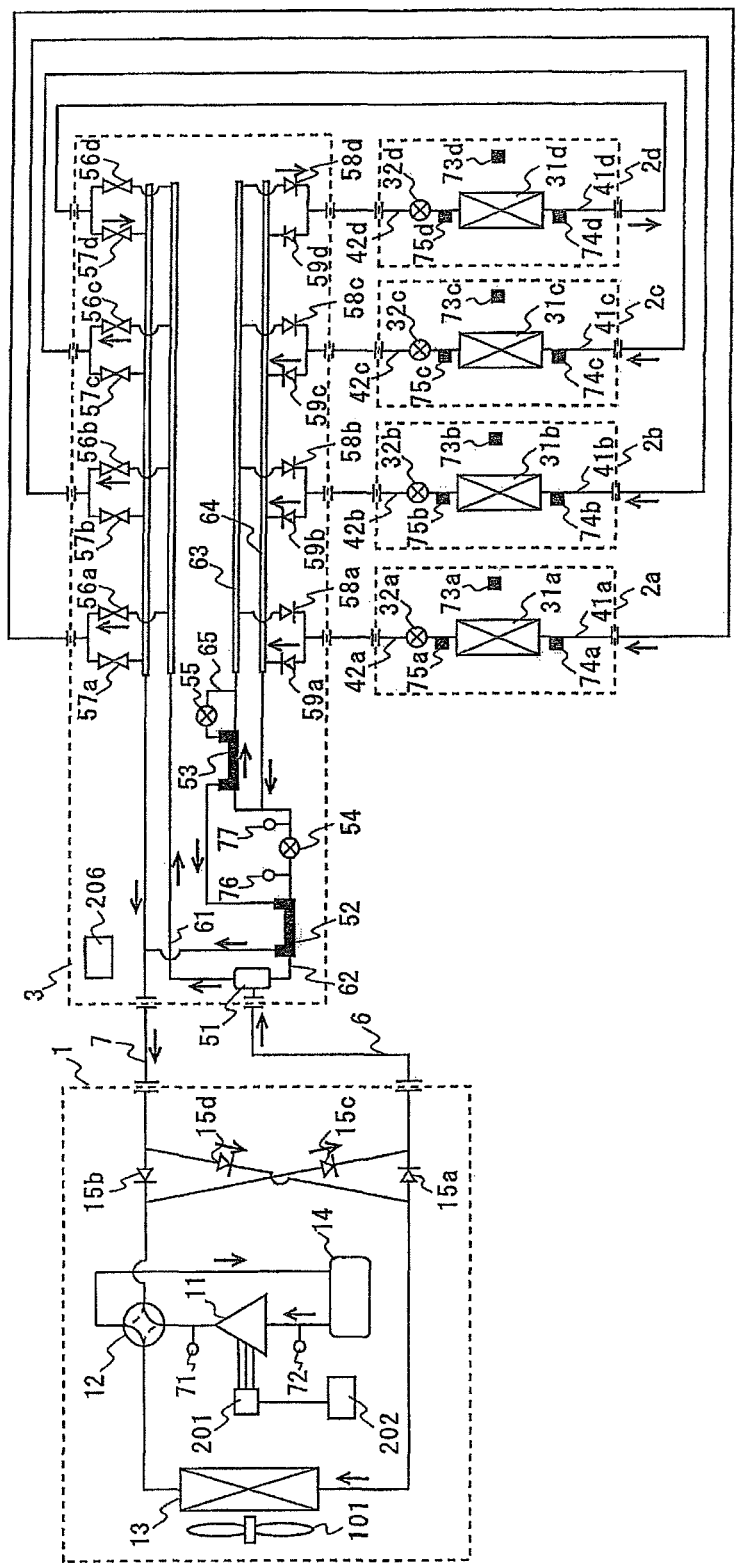
FIG. 5 is a refrigerant circuit diagram illustrating a heating main operation of the air-conditioning apparatus according to Embodiment 2 of the present invention.

FIG. 5 is a refrigerant circuit diagram illustrating a heating main operation of the air-conditioning apparatus according to Embodiment 2 of the present invention. It is assumed here that the indoor units 2a, 2b, and 2c perform a heating operation and the indoor unit 2d performs a cooling operation by way of example. In the outdoor unit 1, the refrigerant sucked by the compressor 11 is compressed and discharged as high-pressure gas refrigerant. The refrigerant that has been discharged from the compressor 11 flows through the four-way valve 12 and through the check valve 15c and the high-pressure pipe 6, and flows out from the outdoor unit 1. The refrigerant that has flowed into the relay unit 3 flows through the gas-liquid separator 51 and the high-pressure gas pipe 61, and flows through the solenoid valves 56a, 56b, 56c and the gas branch pipes 41a, 41b, and 41c into the indoor units 2a, 2b, and 2c that perform a heating operation, respectively.

The gas refrigerant that has flowed into the indoor units 2a, 2b, and 2c flows into the indoor heat exchangers 31a, 31b, and 31c, respectively, and heats air. Pressures of the liquid refrigerant that has flowed out from the indoor heat exchangers 31a, 31b, and 31c are reduced to an intermediate pressure by the expansion valves 32a, 32b, and 32c, respectively, and the liquid refrigerant becomes intermediate-pressure liquid refrigerant. The intermediate-pressure liquid refrigerant flows out from the indoor units 2a, 2b, and 2c, passes through the liquid branch pipes 42a, 42b, and 42c and the check valves 59a, 59b, and 59c, respectively, and the individual streams of the refrigerant join together at the liquid pipe 64.

The resulting intermediate-pressure liquid refrigerant passes through the internal heat exchanger 53, and part thereof flows into the indoor unit 2d through the liquid pipe 63, the check valve 58d, and the liquid branch pipe 42d. The refrigerant that has flowed into the indoor unit 2d expands in response to adjustment of the opening degree of the expansion valve 32d, and the resulting low-temperature low-pressure two-phase gas-liquid refrigerant flows into the indoor heat exchanger 31d and cools air. The gas refrigerant flows out from the indoor unit 2d, passes through the gas branch pipe 41d and the solenoid valve 57d, and reaches the low-pressure pipe 7. On the other hand, the other part of the intermediate-pressure liquid refrigerant that has passed through the internal heat exchanger 53 flows into the bypass pipe 65, passes through the expansion valve 55 which is controlled to make a different between the high pressure at the high-pressure pipe 6 and the intermediate pressure that is a pressure at the liquid pipes 63 and 64 constant, passes through the internal heat exchanger 53 and the internal heat exchanger 52, and reaches the low-pressure pipe 7 where the refrigerant joins the refrigerant that has cooled air in the indoor unit 2d. The resulting refrigerant returns to the outdoor unit 1 as low-temperature low-pressure two-phase gas-liquid refrigerant.

The refrigerant that has flowed into the outdoor unit 1 flows through the check valve 15d into the outdoor heat exchanger 13 where the refrigerant exchanges heat with air to evaporate, and flows out as gas refrigerant or two-phase gas-liquid refrigerant. The refrigerant that has evaporated is sucked by the compressor 11 again through the four-way valve 12 and the accumulator 14.

At this time, pressure at the high-pressure pipe 6 is high, pressure at the outdoor heat exchanger 13 is low, pressure at a portion between the compressor 11 and the check valve 15b is high, and pressure at the low-pressure pipe 7 is low. Accordingly, the refrigerant does not flow through the check valves 15*a* and 15*b*. Also, the solenoid valves 56*d*, 57*a*, 57*b*, and 57*c* are closed. In addition, during this cycle, the refrigerant that has entered the bypass pipe 65 exchanges heat with the refrigerant flowing from the liquid pipe 64 at the internal heat exchanger 53 after the pressure thereof has been reduced by the expansion valve 55. Thus, the refrigerant that flows into the indoor unit 2*d* through the check valve 58*d* and the liquid branch pipe 42*d* is cooled and has a sufficient degree of subcooling.

(Cooling Main Operation)

Figure 6:
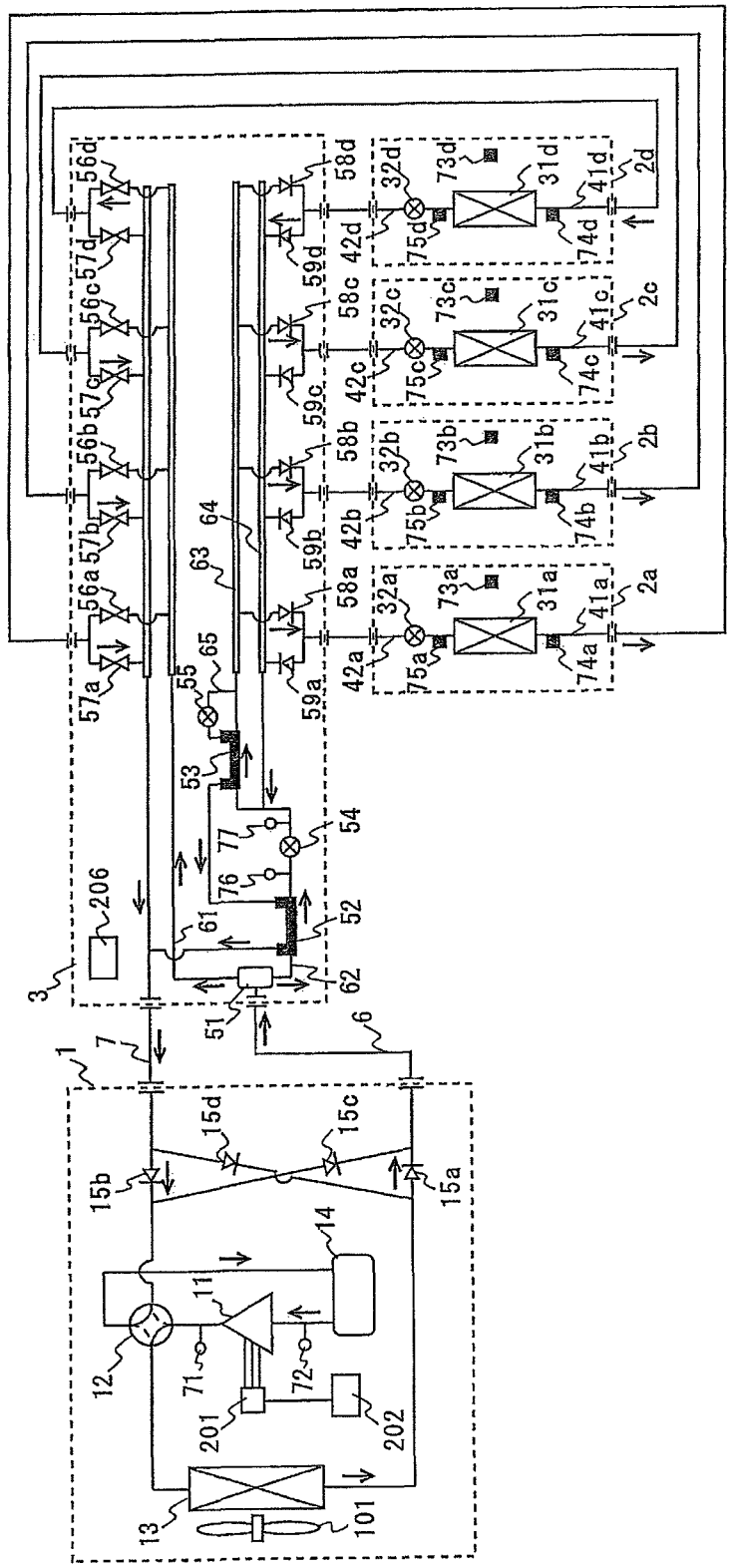
FIG. 6 is a refrigerant circuit diagram illustrating a cooling main operation of the air-conditioning apparatus according to Embodiment 2 of the present invention.

FIG. 6 is a refrigerant circuit diagram illustrating a cooling main operation of the air-conditioning apparatus according to Embodiment 2 of the present invention. It is assumed here that the indoor units 2*a*, 2*b*, and 2*c* perform a cooling operation and the indoor unit 2*d* performs a heating operation by way of example. In the outdoor unit 1, the refrigerant sucked by the compressor 11 is compressed and discharged as high-pressure gas refrigerant. The refrigerant that has been discharged from the compressor 11 flows through the four-way valve 12 and the outdoor heat exchanger 13 functioning as a condenser, where the refrigerant of a given amount condenses, and flows out as high-pressure two-phase gas-liquid refrigerant. The refrigerant then flows through the check valve 15*a* and the high-pressure pipe 6, and flows out from the outdoor unit 1. The refrigerant that has flowed into the relay unit 3 flows through the gas-liquid separator 51 where the refrigerant is separated into gas refrigerant and liquid refrigerant. The separated gas refrigerant passes through the high-pressure gas pipe 61, and flows through the solenoid valve 56*d* and the gas branch pipe 41*d* into the indoor unit 2*d* that performs a heating operation.

The gas refrigerant that has flowed into the indoor unit 2*d* flows into the indoor heat exchanger 31*d* and heats air. Pressure of the resulting liquid refrigerant that has flowed out from the indoor heat exchanger 31*d* is reduced to an intermediate pressure by the expansion valve 32*d*, and the liquid refrigerant becomes intermediate-pressure liquid refrigerant. The intermediate-pressure liquid refrigerant flows out from the indoor unit 2*d*, passes through the liquid branch pipe 42*d* and the check valve 59*d*, and then reaches the liquid pipe 64.

On the other hand, the liquid refrigerant separated at the gas-liquid separator 51 flows out from the liquid pipe 62, passes through the internal heat exchanger 52 and the expansion valve 54 which is controlled to make a difference between the high pressure at the high-pressure pipe 6 and the intermediate pressure that is a pressure at the liquid pipes 63 and 64 constant, and joins the liquid refrigerant that has heated air in the indoor unit 2*d* and is flowing through the liquid pipe 64. The resulting liquid refrigerant passes through the internal heat exchanger 53, and part thereof flows into the liquid pipe 63 and flows into the indoor units 2*a*, 2*b*, and 2*c* through the check valves 58*a*, 58*b*, and 58*c* and the liquid branch pipes 42*a*, 42*b*, and 42*c*, respectively.

The refrigerant that has flowed into the indoor units 2*a*, 2*b*, and 2*c* expands in response to adjustment of opening degrees of the expansion valves 32*a*, 32*b*, and 32*c*, and the resulting low-temperature low-pressure two-phase gas-liquid refrigerant flows into the indoor heat exchangers 31*a*, 31*b*, and 31*c* and cools air, respectively. The gas refrigerant flows out from the indoor units 2*a*, 2*b*, and 2*c*, passes through the gas branch pipes 41*a*, 41*b*, and 41*c* and the solenoid valves 57*a*, 57*b*, and 57*c*, respectively, and the individual streams of the refrigerant join together. The resulting refrigerant passes through the low-pressure pipe 7 and returns to the outdoor unit 1. The refrigerant that has flowed into the outdoor unit 1 is sucked by the compressor 11 again through the check valve 15*b*, the four-way valve 12, and the accumulator 14.

At this time, pressure at the high-pressure pipe 6 is high, pressure at a portion between the compressor 11 and the check valve 15*c* is low, pressure at a portion between the outdoor heat exchanger 13 and the check valve 15*d* is high, and pressure at the low-pressure pipe 7 is low. Accordingly, the refrigerant does not flow through the check valves 15*c* and 15*d*. Also, the solenoid valves 56*a*, 56*b*, 56*c*, and 57*d* are closed. Also, during this cycle, the other part of the refrigerant at the liquid pipe 63 flows into the bypass pipe 65, and pressure thereof is reduced by the expansion valve 55, and heat thereof is exchanged with the refrigerant flowing from the liquid pipe 63 into the indoor units 2*a*, 2*b*, and 2*c* at the internal heat exchanger 53. Further, the refrigerant exchanges heat with the refrigerant that flows into the expansion valve 54 at the internal heat exchanger 52. The refrigerant that has evaporated as a result of heat exchange performed at the internal heat exchanger 52 joins at the low-pressure pipe 7 the refrigerant that has cooled air in the indoor units 2*a*, 2*b*, and 2*c*, and returns to the outdoor unit 1. On the other hand, the refrigerant that has been cooled through heat exchange performed at the internal heat exchanger 52 and the internal heat exchanger 53 and has a sufficient degree of subcooling flows into the indoor units 2*a*, 2*b*, and 2*c* through the check valves 58*a*, 58*b*, and 58*c* and the liquid branch pipes 42*a*, 42*b*, and 42*c*, respectively.

<Actuator Control in Refrigeration Cycle Circuit During Simultaneous Cooling and Heating Operation>

Control of the rotation speed of the compressor 11 performed during a heating only operation and a cooling only operation is the same as that of Embodiment 1. During a heating main operation, the outdoor controller controls the rotation speed of the compressor 11 using a discharge pressure detected by the pressure sensor 71 as a target value so as to adjust a flow rate of the refrigerant in the entire refrigeration cycle circuit. That is, in order to prioritize a heating operation, a condensing temperature that allows the indoor unit 2 that performs a heating operation to achieve a predetermined heating performance by controlling the rotation speed of the compressor 11.

Also, in the indoor unit 2 that performs a cooling operation, an evaporating temperature is adjusted by heat exchange amount adjusting means of the outdoor heat exchanger 13. Here, the heat exchange amount adjusting means may be, for example, rotation speed adjusting means of the fan 101, heat transfer area adjusting means for closing some of heat transfer pipes of the outdoor heat exchangers 13, or bypass means for allowing part of the flowing refrigerant to bypass the outdoor heat exchanger 13. By decreasing the rotation speed of the fan 101 or allowing part of the refrigerant to bypass the outdoor heat exchanger 13, heat conductance of the outdoor heat exchanger 13 decreases, and by closing some of the heat transfer pipes, the heat transfer area decreases. By performing any of these or using these in combination, a temperature difference between temperature of air outside the outdoor heat exchanger 13 and the evaporating temperature of the refrigerant increases, and thus the evaporating temperature decreases. Also, by increasing the rotation speed of the fan 101 or by decreasing an amount of bypassed part of the refrigerant from the state where the heat exchange amount adjusting means is operating, heat conductance of the outdoor heat exchanger 13 increases, and by opening the closed some of the heat transfer pipes, the heat transfer area increases, and thus the evaporating temperature increases.

On the other hand, during a cooling main operation, in order to prioritize a cooling operation, the outdoor controller 202 controls the rotation speed of the compressor 11 using the suction pressure detected by the pressure sensor 72 as the target value so as to adjust the evaporating temperature that allows the indoor unit 2 that performs a cooling operation to achieve a predetermined cooling performance. Also, in the indoor unit 2 that performs a heating operation, the condensing temperature is adjusted by the heat exchange amount adjusting means of the outdoor heat exchanger 13. As in the heating main operation, when heat conductance of the outdoor heat exchanger 13 is decreased or the heat transfer area is decreased, a difference between the condensing temperature of the refrigerant at the outside heat exchanger 13 and outside air increases, and thus the condensing temperature increases. When the heat conductance of the outdoor heat exchanger 13 is increased or the heat transfer area is increased, the condensing temperature decreases.

<Control Method for Increasing Performance of at Least One of Indoor Units During Simultaneous Cooling and Heating Operation>

A description will be given of a control method performed by the air-conditioning apparatus according to Embodiment 2 in response to a request to increase performance (air-conditioning performance increase request) from at least one of the indoor units 2, that is, when the air-conditioning performance of at least one of the indoor units 2 is increased. Note that control for increasing the performance is carried out as control for increasing heating performance or control for increasing cooling performance. Here, the case where a request to increase performance is made by the indoor unit 2b will be described.

Figure 7:
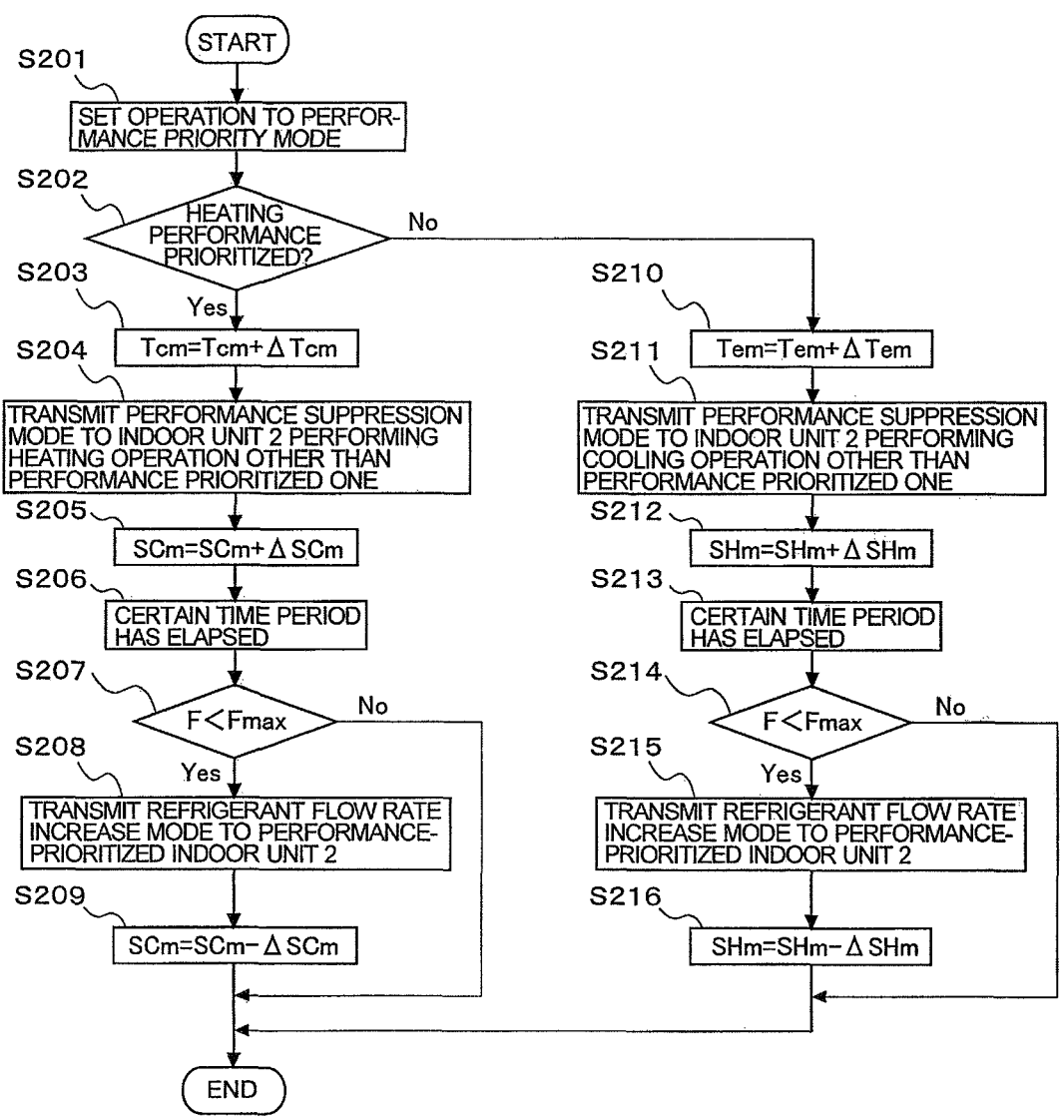
FIG. 7 is a flowchart illustrating control for increasing performance, performed by the air-conditioning apparatus according to Embodiment 2 of the present invention.

FIG. 7 is a flowchart illustrating control for increasing performance performed by the air-conditioning apparatus according to Embodiment 2 of the present invention.

Upon receipt of a request to increase performance from the operation unit 204b of the indoor unit 2b, the indoor controller 203b transmits performance priority to the outdoor controller 202. Upon receipt of the performance priority, the outdoor controller 202 starts the flow of FIG. 7 and sets the operation mode of the air-conditioning apparatus to a performance priority mode (step S201). If the operation mode of the indoor unit 2b is a heating operation in step S202 (Yes), the outdoor controller 202 performs steps S203 to S209. Also, if the operation mode of the indoor unit 2b is the cooling operation (No), the outdoor controller 202 performs steps S210 to S216.

Steps S203 to S209 will be described below. In step S203, the outdoor controller 202 increases the condensing temperature target value Tcm by ΔTcm. At this time, in the case where the air-conditioning apparatus is performing a heating only operation or a heating main operation, the rotation speed F of the compressor 11 is controlled based on the condensing temperature Tc. Accordingly, if the rotation speed F is smaller than the maximum rotation speed Fmax, the rotation speed F of the compressor 11 increases when the condensing temperature target value Tcm increases. On the other hand, in the case where the air-conditioning apparatus is performing a cooling main operation, the heat exchange amount adjusting means of the outdoor heat exchanger 13 is controlled based on the condensing temperature Tc. Accordingly, within a range in which the heat exchange amount adjusting means of the outdoor heat exchanger 13 is operable (for example, if the rotation speed of the fan 101 is not the minimum value), the heat exchange amount adjusting means operates in response to an increase in the condensing temperature target value Tcm, and heat conductance of the outdoor heat exchanger 13 decreases.

In step S204, the outdoor controller 202 transmits a performance suppression mode to the indoor unit 2 that is performing a heating operation among the indoor units 2a, 2c, and 2d other than the performance-prioritized one. The indoor controller 203 of the indoor unit 2 that has received the performance suppression mode increases the degree-of-subcooling target value SCm of the indoor heat exchanger 31 by ΔSCm in step S205. At this time, the opening degree L of the expansion valve 32 is controlled based on the calculated degree of subcooling SC. Accordingly, the opening degree L decreases when the degree-of-subcooling target value SCm increases.

After the outdoor controller 202 allows a predetermined period to pass in step S206, the outdoor controller 202 determines whether the rotation speed F of the compressor 11 is smaller than the maximum value Fmax in step S207. If the rotation speed F is smaller than Fmax (Yes), the outdoor controller 202 transmits a refrigerant flow rate increase mode to the performance-prioritized indoor unit 2b in step S208. The indoor controller 203b that has received the refrigerant flow rate increase mode decreases the degree-of-subcooling target value SCm of the indoor heat exchanger 31b by ΔSCm in step S209. At this time, the opening degree L of the expansion valve 32b is controlled based on the calculated degree of subcooling SC. Accordingly, the opening degree L increases when the degree-of-subcooling target value SCm decreases. That is, when the degree-of-subcooling target value SCm for the expansion valve 32b decreases, the amount of refrigerant that flows through the indoor unit 2b (more specifically, the indoor heat exchanger 31b) increases. At this point, the flow for changing the values of the condensing temperature target value Tcm and the degree-of-subcooling target value SCm ends; however, the resulting Tcm and SCm are maintained until the heating performance priority request is canceled by the operation unit 204b of the indoor unit 2b. If the rotation speed F is Fmax (No) in step S207, the flow ends.

Next, steps S210 to S216 will be described. In step S210, the outdoor controller 202 decreases the evaporating temperature target value Tem by ΔTem. At this time, in the case where the air-conditioning apparatus is performing a cooling only operation or a cooling main operation, the rotation speed F of the compressor 11 is controlled based on the evaporating temperature Te. Accordingly, if the rotation speed F is smaller than the maximum rotation speed Fmax, the rotation speed F of the compressor 11 increases when the evaporating temperature target value Tem decreases. On the other hand, in the case where the air-conditioning apparatus is performing a heating main operation, the heat exchange amount adjusting means of the outdoor heat exchanger 13 is controlled based on the evaporating temperature Te. Accordingly, within a range in which the heat exchange amount adjusting means of the outdoor heat exchanger 13 is operable (for example, if the rotation speed of the fan 101 is not the minimum value), the heat exchange amount adjusting means operates in response to a decrease in the evaporating temperature target value Tem, and heat conductance of the outdoor heat exchanger 13 decreases.

In step S211, the outdoor controller 202 transmits a performance suppression mode to the indoor unit 2 that is performing a cooling operation among the indoor units 2a, 2c, and 2d other than the performance-prioritized one. The indoor controller 203 of the indoor unit 2 that has received the performance suppression mode increases the degree-of-superheat target value SHm of the indoor heat exchanger 31 by ΔSHm in step S212. At this time, the opening degree L of the expansion valve 32 is controlled based on the calculated degree of superheat SH. Accordingly, the opening degree L decreases when the degree-of-superheat target value SHm increases.

After the outdoor controller 202 allows a predetermined period to pass in step S213, the outdoor controller 202 determines whether the rotation speed F of the compressor 11 is smaller than the maximum value Fmax in step S214. If the rotation speed F is smaller than Fmax (Yes), the outdoor controller 202 transmits a refrigerant flow rate increase mode to the performance-prioritized indoor unit 2b in step S215. The indoor controller 203b that has received the refrigerant flow rate increase mode decreases the degree-of-superheat target value SHm of the indoor heat exchanger 31b by ΔSHm in step S216. At this time, the opening degree L of the expansion valve 32b is controlled based on the calculated degree of superheat SH. Accordingly, the opening degree L increases when the degree-of-superheat target value SHm decreases. That is, when the degree-of-superheat target value SHm for the expansion valve 32b decreases, the amount of refrigerant that flows through the indoor unit 2b (more specifically, the indoor heat exchanger 31b) increases. At this point, the flow for changing the values of the evaporating temperature target value Tem and the degree-of-superheat target value SHm ends; however, the resulting Tem and SHm are maintained until the cooling performance priority request is canceled by the operation unit 204b of the indoor unit 2b. If the rotation speed F is Fmax (No) in step S214, the flow ends.

<Effects of Control for Increasing Performance of at Least One of Indoor Units During Simultaneous Cooling and Heating Operation>

As described above, in Embodiment 2, air-conditioning performance of at least one of the indoor units 2 can be increased in the air-conditioning apparatus capable of performing a simultaneous cooling and heating operation even in the case where the operation mode of the entire air-conditioning apparatus is any of the heating only operation, the cooling only operation, the heating main operation, and the cooling main operation and the operation mode of the indoor unit 2 is the heating operation or the cooling operation. That is, performance of at least one of the indoor units 2 can be increased regardless of the operation mode of the air-conditioning apparatus and the operation mode of the indoor unit 2.

Embodiment 3

In Embodiments 1 and 2 above, the air-conditioning apparatuses that circulate the refrigerant directly through the indoor units 2 to perform cooling and heating have been described. Next, an embodiment of an air-conditioning apparatus connected to a unit that allows heat exchange between a refrigerant and a heat medium such as water in an intermediate heat exchanger and circulates the heat medium through the indoor units 2 will be described. That is, in Embodiment 3, an embodiment of an air-conditioning apparatus including indirect indoor units (indirect indoor heat exchangers) that perform air-conditioning in rooms using a heat medium will be described. Note that, in Embodiment 3, components similar to those of Embodiment 1 or Embodiment 2 are denoted by the same reference signs and points not particularly mentioned are similar to those of Embodiment 1 or Embodiment 2.

FIG. 8 is a refrigerant circuit diagram of the air-conditioning apparatus according to Embodiment 3 of the present invention. The air-conditioning apparatus according to Embodiment 3 includes a heat medium relay unit 8 and indoor units 2e, 2f, 2g, and 2h in addition to the configuration of the air-conditioning apparatus described in Embodiment 2. This heat medium relay unit 8 includes intermediate heat exchangers 81 and 82; four-way valves 83 and 84; expansion valves 85, 86, and 87; an internal heat exchanger 88; pumps 91 and 92 serving as heat medium sending means; three-way valves 93 and 94 serving as heat medium flow switching means; a flow control valve 95 serving as heat medium flow control means; and a heat medium relay unit controller 207. Also, the indoor units 2e, 2f, 2g, and 2h include indoor heat exchangers 31e, 31f, 31g, and 31h, respectively. Note that there may be any given number of heat medium relay units 8 and any given number of indoor units 2.

The heat medium relay unit 8 connects a high-pressure gas pipe 66 and the high-pressure gas pipe 61 to each other, connects a liquid pipe 67 and the liquid pipe 64 to each other, and connects a low-pressure pipe 68 and the low-pressure pipe 7 to each other, thereby being connected to the relay unit 3 by the pipes. The heat medium relay unit 8 and each indoor unit 2 (each indoor heat exchanger 31) are connected to each other by heat medium pipes 111 and 112 through which a safe heat medium such as water or antifreeze flows. That is, the heat medium relay unit 8 and each indoor unit 2 (each indoor heat exchanger 31) are connected to each other through a heat medium passage.

Specifically, the indoor units 2a, 2b, 2c, and 2d are connected to the relay unit 3 by pipes, that is, the respective gas branch pipes 41 and the respective liquid branch pipes 42 which are refrigerant pipes. Therefore, the refrigerant circulates directly through the indoor heat exchangers 31a, 31b, 31c, and 31d, and cooling and heating are performed. That is, the indoor heat exchangers 31a, 31b, 31c, and 31d are direct-expansion heat exchangers and the indoor units 2a, 2b, 2c, and 2d are direct-expansion indoor units. On the other hand, the indoor units 2e, 2f, 2g, and 2h are connected to the heat medium relay unit 8 by the heat medium pipes 111 and 112. Therefore, the heat medium circulates through the indoor heat exchangers 31e, 31f, 31g, and 31h, and cooling and heating are performed. That is, the indoor heat exchangers 31e, 31f, 31g, and 31h are indirect heat exchangers and the indoor units 2e, 2f, 2g, and 2h are indirect indoor units.

Figure 9:
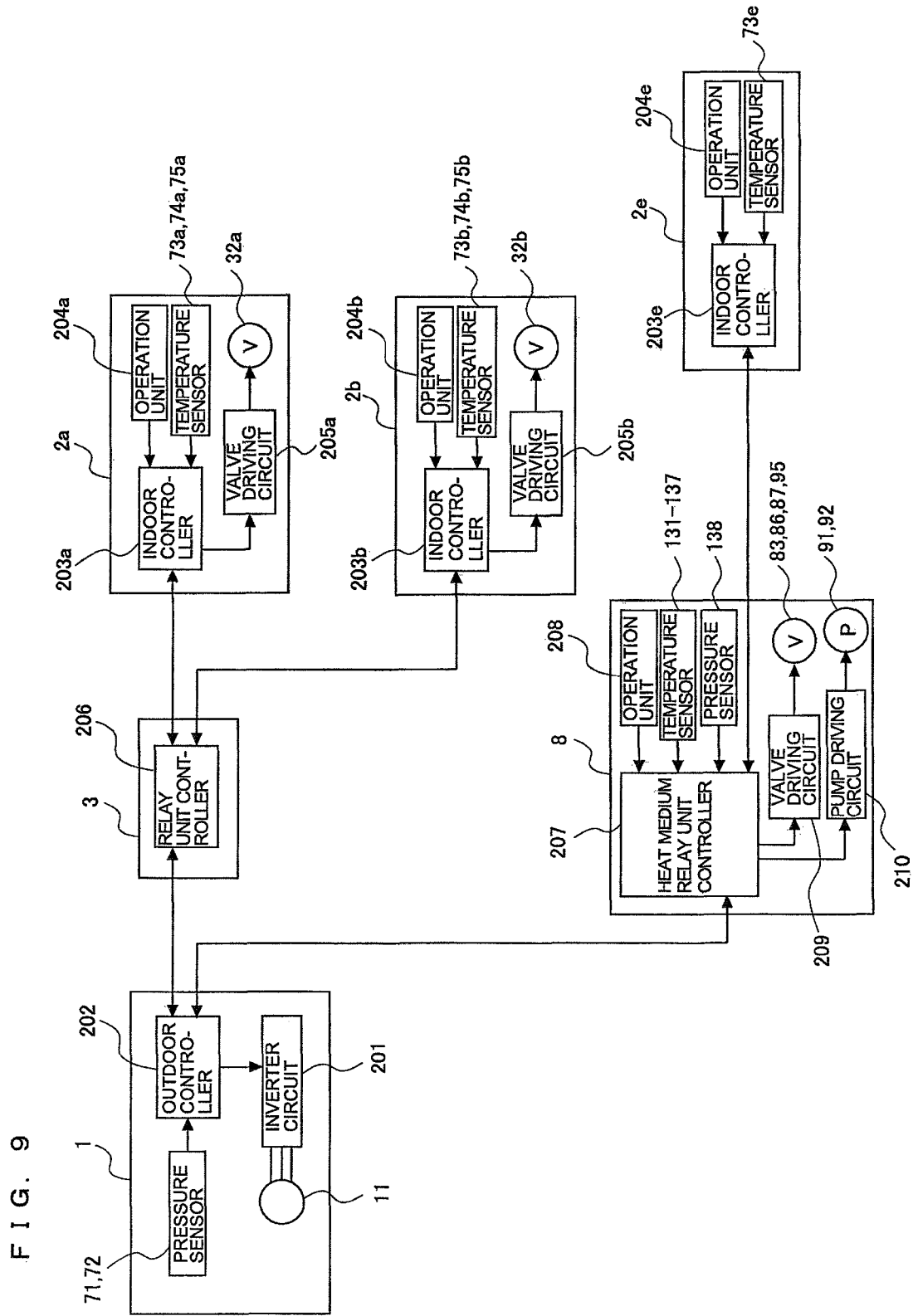
FIG. 9 is a control circuit diagram of the air-conditioning apparatus according to Embodiment 3 of the present invention.

FIG. 9 is a control circuit diagram of the air-conditioning apparatus according to Embodiment 3 of the present invention. The heat medium relay unit 8 includes the heat medium relay unit controller 207, to which a valve driving circuit 209 and a pump driving circuit 210 are connected. This heat medium relay unit controller 207 includes a microcomputer and peripheral circuits of the microcomputer, and is supplied with various control commands in form of serial signals from the outdoor controller 202. Also, the relay unit controller 206 communicates with the indoor controllers 203a, 203b, 203c, and 203d of the indoor units 2a, 2b, 2c, and 2d connected to the relay unit 3 by pipes, respectively. The relay unit controller 206 integrates pieces of operation information of the indoor units 2a, 2b, 2c, and 2d, and communicates the resulting information to the outdoor controller 202. Further, the heat medium relay unit controller 207 communicates with indoor controllers 203e, 203f, 203g, and 203h of the indoor units 2e, 2f, 2g, and 2h connected to the heat medium relay unit 8 by pipes, respectively. The heat medium relay unit controller 207 integrates pieces of operation information of the indoor units 2e, 2f, 2g, and 2h and communicates the resulting information to the outdoor controller 202. Note that FIG. 9 only illustrates the indoor unit 2e and the indoor controller 203e thereof.

The intermediate heat exchangers 81 and 82 each include a heat transfer portion allowing the refrigerant to pass therethrough and a heat transfer portion allowing the heat medium to pass therethrough, and allow intermediate heat exchange between the refrigerant and the heat medium. Depending on the operation modes of the indoor units 2 which are indirect indoor units, the intermediate heat exchangers 81 and 82 each may function as a condenser to cause the refrigerant to transfer its heat to heat the heat medium and may function as an evaporator to cause the refrigerant to remove heat to cool the heat medium.

The pumps 91 and 92 apply pressure to the heat medium to circulate the heat medium. Here, the flow rate of the heat medium sent out (discharge flow rate) can be changed by changing the rotation speed of a motor (not illustrated) included in each of the pumps 91 and 92 within a predetermined range.

The three-way valves 93 each connect a heat medium pipe 115 or a heat medium pipe 116 to the heat medium pipe 111 in a switching manner. The three-way valves 94 each connect a heat medium pipe 113 or a heat medium pipe 114 to the heat medium pipe 112 in a switching manner. The flow control valves 95 each adjust the flow rate of the heat medium that flows into the corresponding indoor unit 2.

The outdoor unit 1 and the relay unit 3 are connected to each other by the high-pressure pipe 6 and the low-pressure pipe 7 which are refrigerant pipes. Also, the relay unit 3 and the indoor units 2 are connected to each other by the gas branch pipes 41 and the liquid branch pipes 42 which are the refrigerant pipes.

This refrigeration cycle circuit also includes various pressure sensors and temperature sensors.

A pressure sensor 138 detects a condensing pressure in the case where the intermediate heat exchangers 81 and 82 function as condensers. Note that the pressure sensor 138 may be at any position where the condensing pressure at the intermediate heat exchangers 81 and 82 is detectable. A temperature sensor 131 is installed between the four-way valve 83 and the intermediate heat exchanger 81. A temperature sensor 132 is installed between the intermediate heat exchanger 81 and the expansion valve 85. A temperature sensor 133 is installed between the four-way valve 84 and the intermediate heat exchanger 82. A temperature sensor 134 is installed between the intermediate heat exchanger 82 and the expansion valve 86. The temperature sensors 131, 132, 133, and 134 each detect a temperature of the refrigerant. A temperature sensor 135 is installed at the heat medium pipe 115, and detects a temperature of the heat medium that flows out from the intermediate heat exchanger 81. A temperature sensor 136 is installed at the heat medium pipe 116, and detects a temperature of the heat medium that flows out from the intermediate heat exchanger 82. Each of temperature sensors 137 is installed at the corresponding heat medium pipe 112, and detects a temperature of the heat medium that flows out from the corresponding indoor unit 2 serving as an indirect indoor unit.

<Operation Modes>

Subsequently, an operation of the air-conditioning apparatus in each operation mode will be described based on the flows of the refrigerant and the heat medium. Note that because operations of the relay unit 3 and the direct-expansion indoor units 2 are the same as those of Embodiment 2, operations of the heat medium relay unit 8 and the indirect indoor units 2 alone will be described. As operation modes of the heat medium relay unit 8 and the indirect indoor units 2, a water heating mode in which all the indoor units 2 perform a heating operation, a water cooling mode in which all the indoor units 2 perform a cooling operation, and a water-cooling and water-heating mixed mode in which a cooling operation and a heating operation coexist will be described.

(Water Heating Mode)

The water heating mode in which all the operation modes of the indoor units 2e, 2f, 2g, and 2h are a heating operation will be described using FIG. 8. The flow of the refrigerant is represented by unfilled-head solid-line arrows, and the flow of the heat medium is represented by filled-head dashed-line arrows. At this time, the four-way valve 83 is configured to connect the high-pressure gas pipe 66 and the intermediate heat exchanger 81 to each other by pipes. The four-way valve 84 is configured to connect the high-pressure gas pipe 66 and the intermediate heat exchanger 82 to each other by pipes. Each of the three-way valves 93 is configured to have an intermediate opening degree so as to allow the heat medium that flows through the heat medium pipe 115 and the heat medium that flows through the heat medium pipe 116 to be mixed and flow through the corresponding heat medium pipe 111. Each of the three-way valves 94 is configured to have an intermediate opening degree so as to allow the heat medium that flows through the corresponding heat medium pipe 112 to branch into the heat medium pipe 113 and the heat medium pipe 114.

First, the flow of the refrigerant in the refrigeration cycle circuit will be described. The gas refrigerant that has flowed into the heat medium relay unit 8 through the high-pressure gas pipe flows into the intermediate heat exchangers 81 and 82 through the four-way valves 83 and 84, respectively. Because the intermediate heat exchangers 81 and 82 function as condensers for the refrigerant, the refrigerant that passes through the intermediate heat exchangers 81 and 82 heat the heat medium serving as a heat exchange target and liquefies (transfers its heat to the heat medium). Pressures of the liquid refrigerant that has flowed out from the intermediate heat exchangers 81 and 82 are reduced to an intermediate pressure by the expansion valves 85 and 86, respectively, and the liquid refrigerant becomes intermediate-pressure liquid refrigerant. The individual streams of the liquid refrigerant join together at the liquid pipe 67, and the resulting refrigerant flows out from the heat medium relay unit 8 and returns to the liquid pipe 64 of the relay unit 3.

Next, the flow of the heat medium in a heat medium circulation circuit will be described. The heat medium is heated through heat exchange with the refrigerant at the intermediate heat exchangers 81 and 82. The heat medium heated at the intermediate heat exchanger 81 is sent out through the heat medium pipe 115, and the heat medium heated at the intermediate heat exchanger 82 is sent out through the heat medium pipe 116. Because the three-way valves 93 each have an intermediate opening degree, the heat medium that flows from the heat medium pipe 115 and the heat medium that flows from the heat medium pipe 116 are mixed in approximately equal proportions. The resulting heat medium flows through the corresponding heat medium pipe 111, and flows out from the heat medium relay unit 8. The heat medium that has flowed into the indoor unit 2 exchanges heat with air transported by a fan (not illustrated) at the indoor heat exchanger 31, and heats the air and its temperature decreases (its heat is transferred to the air). In this way, the indoor unit 2 performs heating.

The heat medium that has been discharged from the indoor unit 2 flows into the heat medium relay unit 8 through the heat medium pipe 112. The heat medium that has flowed in flows through the flow control valve 95 and is distributed to the heat medium pipe 113 and the heat medium pipe 114 by the three-way valve 94. Pressure is applied to the heat medium that flows through the heat medium pipe 113 by the pump 91, and the heat medium returns to the intermediate heat exchanger 81 again. Pressure is applied to the heat medium that flows through the heat medium pipe 114 by the pump 92, and the heat medium returns to the intermediate heat exchanger 82 again.

(Water Cooling Mode)

The water cooling mode in which all the operation modes of the indoor units 2e, 2f, 2g, and 2h are a cooling operation will be described using FIG. 8. The flow of the refrigerant is represented by unfilled-head dashed-line arrows, and the flow of the heat medium is denoted by filled-head dashed-line arrows. At this time, the four-way valve 83 is configured to connect the low-pressure pipe 68 and the intermediate heat exchanger 81 to each other by pipes. The four-way valve 84 is configured to connect the low-pressure pipe 68 and the intermediate heat exchanger 82 to each other by pipes. Each of the three-way valves 93 is configured to have an intermediate opening degree so as to allow the heat medium that flows through the heat medium pipe 115 and the heat medium that flows through the heat medium pipe 116 to be mixed and flow through the corresponding heat medium pipe 111. Each of the three-way valves 94 is configured to have an intermediate opening degree so as to allow the heat medium that flows through the corresponding heat medium pipe 112 to branch into the heat medium pipe 113 and the heat medium pipe 114.

First, the flow of the refrigerant in the refrigerant cycle circuit will be described. The intermediate-pressure refrigerant that has flowed into the heat medium relay unit 8 through the liquid pipe 67 passes through the internal heat exchanger 88, and pressure thereof is reduced by the expansion valves 85 and 86 and the refrigerant becomes low-temperature low-pressure two-phase gas-liquid refrigerant. The low-temperature low-pressure refrigerant flows into the intermediate heat exchangers 81 and 82. Because the intermediate heat exchangers 81 and 82 function as evaporators for the refrigerant, the refrigerant that passes through the intermediate heat exchangers 81 and 82 cools the heat medium serving as a heat exchange target (removes heat from the heat medium) and becomes gas refrigerant, and flows out. The refrigerant that has flowed out passes through the four-way valves 83 and 84 and the individual streams of the refrigerant join together at the low-pressure pipe 68, and the resulting refrigerant flows out from the heat medium relay unit 8. The refrigerant that has flowed out flows through the low-pressure pipe 7 of the relay unit 3.

Also, during this cycle, part of the refrigerant flowing through the liquid pipe 67 flows into a bypass pipe 69, pressure thereof is reduced by the expansion valve 87, and heat thereof is exchanged with the refrigerant that flows from the liquid pipe 67 to the expansion valves 85 and 86 at the internal heat exchanger 88. The refrigerant that has evaporated as a result of heat exchange at the internal heat exchanger 88 joins at the low-pressure pipe 68 the refrigerant that has evaporated at the intermediate heat exchangers 81 and 82, and the resulting refrigerant returns to the relay unit 3. On the other hand, the refrigerant that has been cooled as a result of heat exchange at the internal heat exchanger 88 and has a sufficient degree of subcooling flows into the intermediate heat exchangers 81 and 82 through the expansion valves 85 and 86, respectively.

Next, the flow of the heat medium in the heat medium circulation circuit will be described. The heat medium is cooled through heat exchange with the refrigerant at the intermediate heat exchangers 81 and 82. The heat medium cooled at the intermediate heat exchanger 81 is sent out through the heat medium pipe 115, and the heat medium cooled at the intermediate heat exchanger 82 is sent out through the heat medium pipe 116. Because the three-way valves 93 each have an intermediate opening degree, the heat medium that flows from the heat medium pipe 115 and the heat medium that flows from the heat medium pipe 116 are mixed in approximately equal proportions. The resulting heat medium flows through the corresponding heat medium pipe 111, and flows out from the heat medium relay unit 8. The heat medium that has flowed into the indoor unit 2 exchanges heat with air transported by a fan (not illustrated) in the indoor heat exchanger 31, and cools the air and its temperature increases (heat is removed from the air). In this way, the indoor unit 2 performs cooling.

The heat medium that has been discharged from the indoor unit 2 flows into the heat medium relay unit 8 through the heat medium pipe 112. The heat medium that has flowed in flows through the flow control valve 95 and is distributed to the heat medium pipe 113 and the heat medium pipe 114 by the three-way valve 94. Pressure is applied to the heat medium that flows through the heat medium pipe 113 by the pump 91, and the heat medium returns to the intermediate heat exchanger 81 again. Pressure is applied to the heat medium that flows through the heat medium pipe 114 by the pump 92, and the heat medium returns to the intermediate heat exchanger 82 again.

As described above, in the heat medium relay unit 8, the refrigerant pipes of the intermediate heat exchangers 81 and 82 are connected in parallel with each other in the water heating mode and the water cooling mode.

(Water-Cooling and Water-Heating Mixed Mode)

Figure 10:
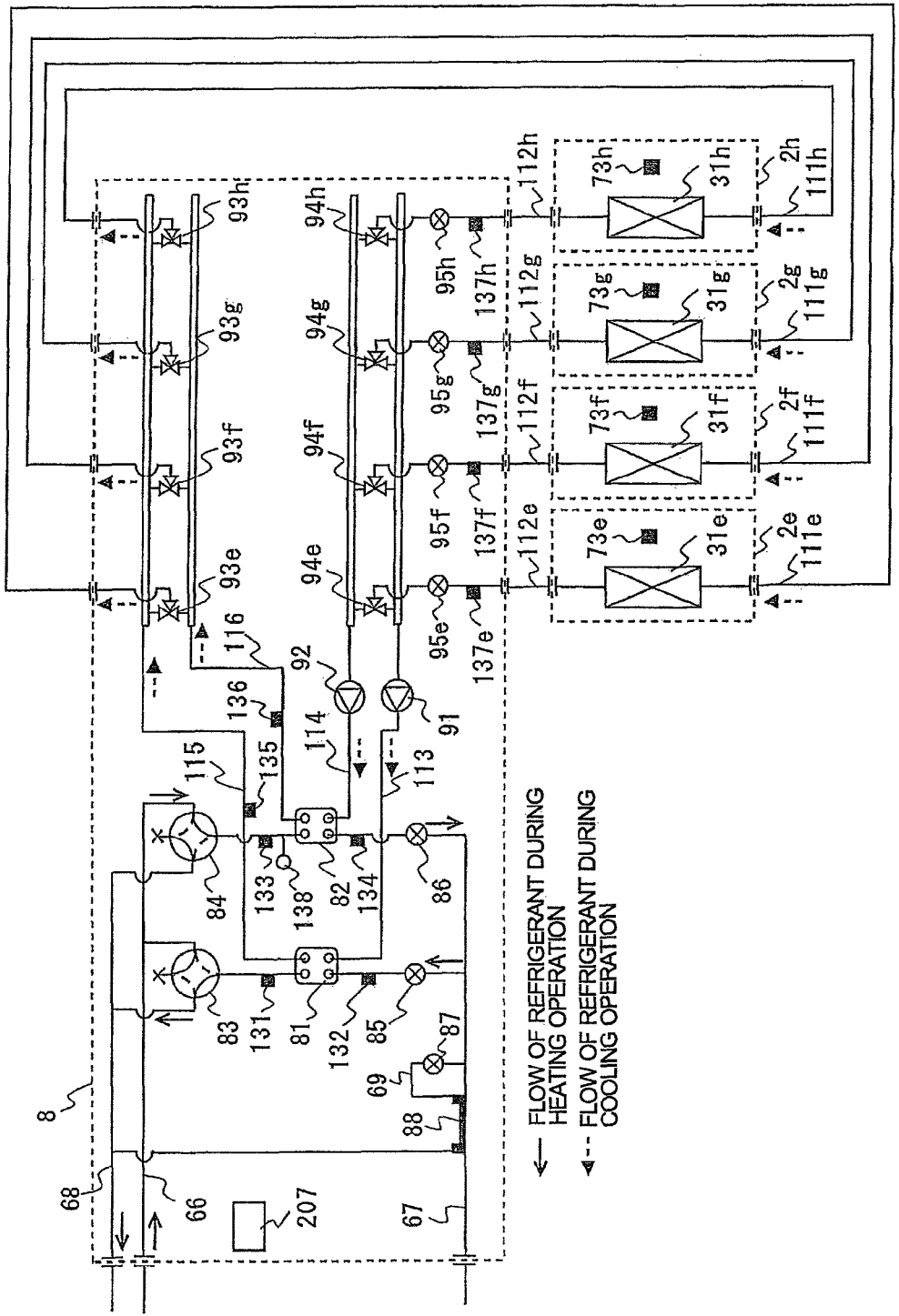
FIG. 10 is a refrigerant circuit diagram illustrating a water-cooling and water-heating mixed mode of the air-conditioning apparatus according to Embodiment 3 of the present invention.

The water-cooling and water-heating mixed mode in which operation modes of the indoor units 2e, 2f, 2g, and 2h include both a heating operation and a cooling operation will be described using FIG. 10. Note that the flow of the refrigerant is represented by unfilled-head solid-line arrows, and the flow of the heat medium is represented by filled-head dashed-line arrows. For example, the case where the indoor units 2e and 2f perform a heating operation and the indoor units 2g and 2h perform a cooling operation will be described. At this time, the four-way valve 83 is configured to connect the low-pressure pipe 68 and the intermediate heat exchanger 81 to each other by pipes. The four-way valve 84 is configured to connect the high-pressure gas pipe 66 and the intermediate heat exchanger 82 to each other by pipes. The three-way valves 93e and 93f are configured to allow the heat medium that flows through the heat medium pipe 116 to flow through the heat medium pipes 111e and 111f, respectively. The three-way valves 93g and 93h are configured to allow the heat medium that flows through the heat medium pipe 115 to flow through the heat medium pipes 111g and 111h, respectively. The three-way valves 94e and 94f are configured to allow the heat medium that flows through the heat medium pipes 112e and 112f to flow through the heat medium pipe 114, respectively. The three-way valves 94g and 94h are configured to allow the heat medium that flows through the heat medium pipes 112g and 112h to flow through the heat medium pipe 113, respectively.

First, the flow of the refrigerant in the refrigeration cycle circuit will be described. The gas refrigerant that has flowed into the heat medium relay unit 8 through the high-pressure gas pipe 66 flows into the intermediate heat exchanger 82 through the four-way valve 84. Pressure of the liquid refrigerant that has condensed at and has flowed out from the intermediate heat exchanger 82 is reduced to an intermediate pressure by the expansion valve 86, and pressure of the entirety or part of the refrigerant is reduced by the expansion valve 85 so that the refrigerant becomes low-temperature low-pressure two-phase gas-liquid refrigerant. The low-temperature low-pressure refrigerant flows into the intermediate heat exchanger 81. The refrigerant that has evaporated at and has flowed out from the intermediate heat exchanger 81 flows out from the heat medium relay unit 8 through the four-way valve 83 and the low-pressure pipe 68. The refrigerant that has flowed out flows through the low-pressure pipe 7 of the relay unit 3.

Here, the flow of the intermediate-pressure liquid refrigerant at the liquid pipe 67 changes depending on the case where the heating load is larger than the cooling load and in the case where the heating load is smaller than the cooling load in the heat medium relay unit 8. First, in the case where the heating load is larger than the cooling load, the flow rate of the refrigerant related to evaporation at the intermediate heat exchanger 81 is smaller than the flow rate of refrigerant related to condensation at the intermediate heat exchanger 82. Accordingly, part of the intermediate-pressure liquid refrigerant obtained by pressure reduction by the expansion valve 86 returns to the relay unit 3 through the liquid pipe 67. On the other hand, in the case where the heating load is smaller than the cooling load, the flow rate of the refrigerant related to evaporation at the intermediate heat exchanger 81 is larger than the flow rate of refrigerant related to condensation at the intermediate heat exchanger 82. Accordingly, the liquid refrigerant that flows from the liquid pipe 67 to the heat medium relay unit 8 flows into the expansion valve 85 in addition to the intermediate-pressure liquid refrigerant obtained by pressure reduction by the expansion valve 86.

Next, the flow of the heat medium in the heat medium circulation circuit will be described. As for the heat medium related to a heating operation, the heat medium is heated as a result of heat exchange with the refrigerant at the intermediate heat exchanger 82. The heat medium heated at the intermediate heat exchanger 82 is sent out through the heat medium pipe 116. The heat medium that flows through the heat medium pipe 116 passes through the three-way valves 93e and 93f, flows through the heat medium pipes 111e and 111f, and flows out from the heat medium relay unit 8, respectively. The heat medium that has flowed into the indoor units 2e and 2f heat air at the indoor heat exchangers 31e and 31f, respectively.

The heat medium that has been discharged from the indoor units 2e and 2f flows into the heat medium relay unit 8 through the heat medium pipes 112e and 112f, respectively. The heat medium that has flowed in flows through the flow control valves 95e and 95f and the three-way valves 94e and 94f, respectively, and flows into the heat medium pipe 114. Pressure is applied to the heat medium that flows through the heat medium pipe 114 by the pump 92, and the heat medium returns to the intermediate heat exchanger 82 again.

As for the heat medium related to a cooling operation, the heat medium is cooled as a result of heat exchange with the refrigerant at the intermediate heat exchanger 81. The heat medium cooled at the intermediate heat exchanger 81 is sent out through the heat medium pipe 115. The heat medium that flows through the heat medium pipe 115 passes through the three-way valves 93g and 93h, flows through the heat medium pipes 111g and 111h, and flows out from the heat medium relay unit 8, respectively. The heat medium that has flowed into the indoor units 2g and 2h cools air at the indoor heat exchangers 31g and 31h, respectively.

The heat medium that has been discharged from the indoor units 2g and 2h flows into the heat medium relay unit 8 through the heat medium pipes 112g and 112h, respectively. The heat medium that has flowed in flows through the flow control valves 95g and 95h and the three-way valves 94g and 94h, respectively, and flows into the heat medium pipe 113. Pressure is applied to the heat medium that flows through the heat medium pipe 113 by the pump 91, and the heat medium returns to the intermediate heat exchanger 81 again.

The operation modes of the heat medium relay unit 8 and the indirect indoor units 2 have been described above. As described in Embodiment 2, the operation mode of the entire air-conditioning apparatus is set to be a heating only operation, a cooling only operation, a heating main operation, or a heating main operation in accordance with a balance between the heating load and the cooling load of all the indoor units 2a, 2b, 2c, 2d, 2e, 2f, 2g, and 2h.

<Actuator Control in Refrigeration Cycle Circuit (Refrigerant Passage)>

The opening degrees of the expansion valves 85 and 86 are each controlled in accordance with a command from the heat medium relay unit controller 207. Specifically, during a heating operation, the opening degrees are controlled using the degrees of subcooling of the intermediate heat exchangers 81 and 82 as target values so as to adjust the flow rates of the refrigerant that flows into the intermediate heat exchangers 81 and 82, respectively. A method for calculating the degree of subcooling is as described below. The condensing pressure detected by the pressure sensor 138 is converted by the heat medium relay unit controller 207 into a condensing temperature which is a saturation temperature. The heat medium relay unit controller 207 then calculates the degrees of subcooling from differences between the condensing temperature and the liquid-side temperatures of the refrigerant detected by the temperature sensors 132 and 134. During a cooling operation, the opening degrees are controlled using the degrees of superheat of the intermediate heat exchanges 81 and 82 as target values so as to adjust the flow rates of the refrigerant that flows into the intermediate heat exchangers 81 and 82, respectively. The degrees of superheat are calculated by the heat medium relay unit controller 207 from differences between the gas-side temperatures of the refrigerant detected by the temperature sensors 131 and 133 and the liquid-side temperatures of the refrigerant detected by the temperature sensors 132 and 134, respectively.

<Actuator Control in Heat Medium Passage>

The opening degrees of the flow control valves 95 are each controlled in accordance with a command from the heat medium relay unit controller 207. Specifically, the opening degree is controlled using a heat medium outlet-inlet temperature difference of the indoor heat exchanger 31 as a target value so as to adjust the flow rate of the heat medium that flows into the indoor heat exchanger 31. The temperature at the inlet of the indoor heat exchanger 31 is an average of temperatures of the heat medium detected by the temperature sensor 135 and the temperature sensor 136 in the water heating mode and the water cooling mode. In the water-cooling and water-heating mixed mode, the temperature of the heat medium detected by the temperature sensor 136 is used for the flow control valve 95 connected by pipes to the indoor unit 2 that performs a heating operation, whereas the temperature of the heat medium detected by the temperature sensor 135 is used for the flow control valve 95 connected by pipes to the indoor unit 2 that performs a cooling operation. As the temperature at the outlet of the indoor heat exchanger 31, the temperature of the heat medium detected by the temperature sensor 137 is used. The heat medium outlet-inlet temperature difference is calculated from a difference between the temperature at the inlet and the temperature at the outlet. The heat medium outlet-inlet temperature difference is preferably set to approximately 5 to 7 degrees.

Specifically, let T[135] to T[137] represent temperatures of the heat medium detected by the temperature sensors 135 to 137, respectively. Then, the heat medium outlet-inlet temperature difference ΔTwh of the indoor heat exchanger 31 in the water heating mode is ΔTwh={(T[135]+T[136])/2}−T[137]. Also, the heat medium outlet-inlet temperature difference ΔTwc of the indoor heat exchanger 31 in the water cooling mode is ΔTwc=T[137]−{(T[135]+T[136])/2}. Also, the heat medium outlet-inlet temperature difference ΔTwh of the indoor heat exchanger 31 of the indoor unit 2 that performs a heating operation in the water-cooling and water-heating mixed mode is ΔTwh=T[136]−T[137]. Also, the heat medium outlet-inlet temperature difference ΔTwc of the indoor heat exchanger 31 of the indoor unit 2 that performs a cooling operation in the water-cooling and water-heating mixed mode is ΔTwc=T[137]−T[135].

The rotation speeds of the pumps 91 and 92 are each controlled in accordance with a command from the heat medium relay unit controller 207. Specifically, in the water-cooling and water-heating mixed mode, the rotation speed of the pump 92 is adjusted such that the opening degree of the flow control valve 95 having the largest opening degree among the flow control valves 95 connected by pipes to the indoor units 2 that are performing a heating operation becomes maximum. For example, when the indoor units 2e and 2f are performing a heating operation and the opening degree of the flow control valve 95e is 70% and the opening degree of the flow control valve 95f is 50% relative to the maximum opening degree value of 100%, the heat medium relay unit controller 207 determines that the total amount of circulating heat medium is excessive, and degreases the rotation speed of the pump 92 so that the opening degree of the flow control valve 95e becomes closer to a stable opening degree, that is, a range in which control of the rotation speed of the pump 92 is not performed. At this time, it is desirable that the stable opening degree of the flow control valve 95e be approximately 90 to 95%. Also, if the opening degree of the flow control valve 95e exceeds the stable opening degree and becomes 100%, for example, the heat medium relay unit controller 207 determines that the total amount of circulating heat medium is insufficient, and increases the rotation speed of the pump 92 so that the opening degree of the flow control valve 95e becomes closer to the stable opening degree.

The similar control is performed on the pump 91 for the indoor units 2 that are performing a cooling operation.

In the water heating mode and the water cooling mode, the same rotation speed is set for the pumps 91 and 92, and the similar control is performed.

As described above, a heat medium transportation power can be reduced by controlling the rotation speeds of the pumps 91 and 92 so that the opening degree of the flow control valve 95 becomes maximum.

For the indoor unit 2 that is stopped, the opening degree of the flow control valve 95 is set to an opening degree at which the heat medium does not flow.

<Control Method for Increasing Capacity of Intermediate Heat Exchanger in Water-Cooling and Water-Heating Mixed Mode>

In the air-conditioning apparatus according to Embodiment 3, when the heat medium relay unit 8 is in the water-cooling and water-heating mixed mode, a heat transfer area of the intermediate heat exchanger 82 that functions as a condenser is approximately a half of a heat transfer area obtained in the case where both the intermediate heat exchangers 81 and 82 function as condensers in the water heating mode. It is assumed here that a design is made such that a total heating capacity rating of the indirect indoor units 2 is achieved when both the intermediate heat exchangers 81 and 82 function as condensers. Then, in the case where the heating load of the indirect indoor units 2 is sufficiently large in the water-cooling and water-heating mixed mode, the heat transfer area of the intermediate heat exchanger 82 that functions as a condenser is small relative to the heating load. Accordingly, the heat medium cannot be sufficiently heated relative to the heating load by adjusting the condensing temperature to a predetermined range. Also, a flow rate of the heat medium sent out by the pump 92 that sends out the heat medium related heating is approximately a half of a flow rate of the case where the pumps 91 and 92 send out the heat medium related to heating. At this time, the flow rate of the heat medium sent out by the pump 92 also becomes insufficient, and consequently the heating performance per indoor unit 2 decreases.

On the other hand, in the case where the heat medium relay unit 8 is in the water-cooling and water-heating mixed mode and the cooling load is sufficiently large, the heat medium cannot be sufficiently cooled relative to the cooling load in the intermediate heat exchanger 81 and the flow rate of the heat medium sent out by the pump 91 becomes insufficient, and consequently the cooling performance per indoor unit 2 decreases.

However, increasing the sizes or the numbers of intermediate heat exchangers 81 and 82 and pumps 91 and 92 in case for a sufficiently large heating load or a sufficiently large cooling load in the water-cooling and water-heating mixed mode not only leads to upsizing of the apparatus but also makes the apparatus costly and not economical.

Accordingly, in Embodiment 3, control for increasing performance is performed on the intermediate heat exchanger 81 or the intermediate heat exchanger 82 when the heat medium relay unit 8 and the indirect indoor units 2 are in the water-cooling and water-heating mixed mode. Here, the intermediate heat exchanger 81 or the intermediate heat exchanger 82 corresponds to the first use side heat exchanger. The direct-expansion indoor heat exchangers 31a, 31b, 31c, and 31d each correspond to the second use side heat exchanger.

Specific control will be described using a flowchart of FIG. 11.

Figure 11:
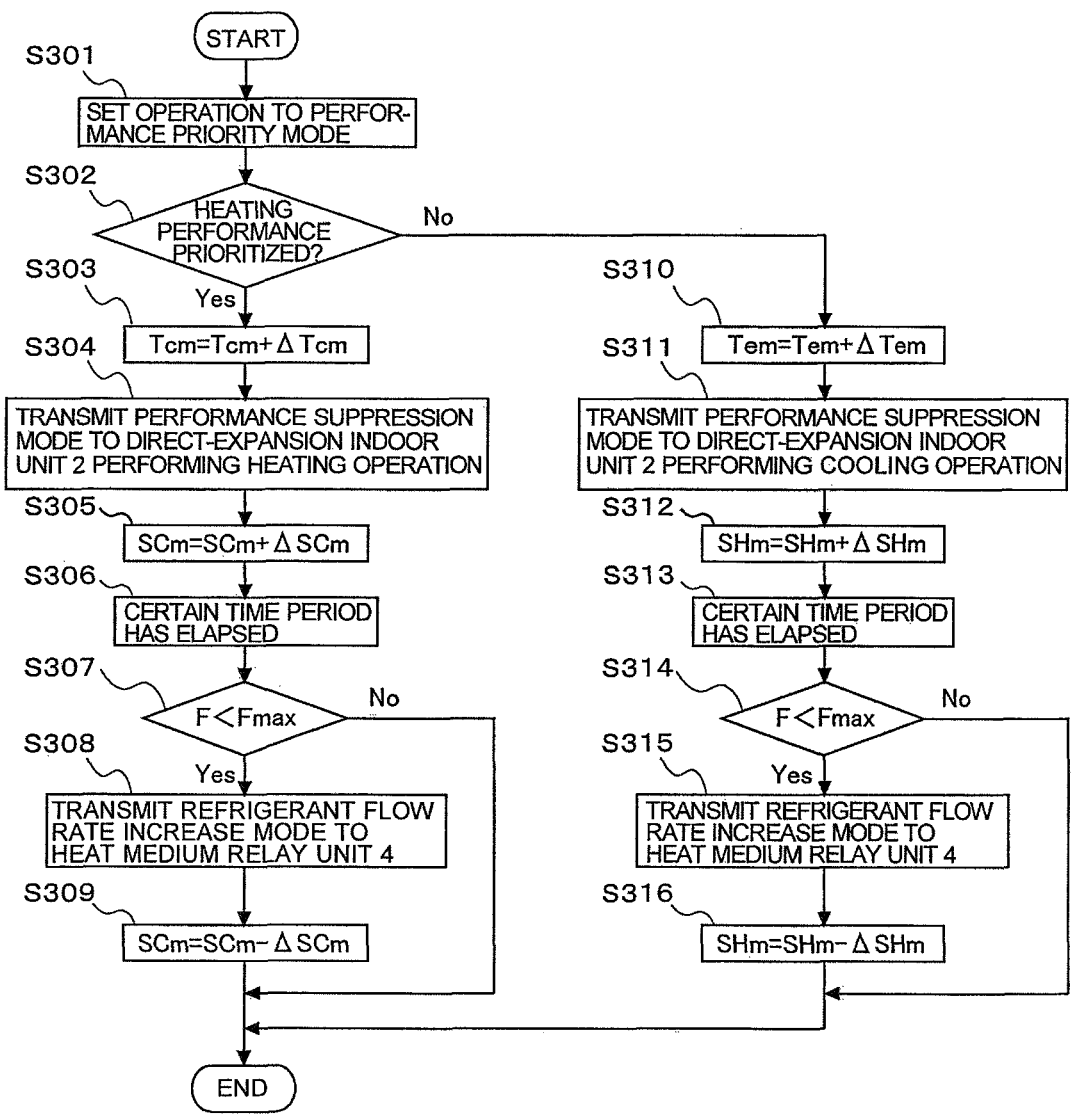
FIG. 11 is a flowchart illustrating control for increasing performance performed by the air-conditioning apparatus according to Embodiment 3 of the present invention.

FIG. 11 is a flowchart illustrating control for increasing performance of the air-conditioning apparatus according to Embodiment 3 of the present invention.

Upon a request to increase heating performance or a request to increase cooling performance being sent to the heat medium relay unit controller 207 from an operation unit 208 of the heat medium relay unit 8 when the heat medium relay unit 8 and the indirect indoor units 2 are in the water-cooling and water-heating mixed mode, the heat medium relay unit controller 207 transmits performance priority to the outdoor controller 202. Upon receipt of the performance priority, the outdoor controller 202 starts the flow of FIG. 11 and sets the operation mode of the air-conditioning apparatus to a performance priority mode (step S301). The outdoor controller 202 performs step S303 to step S309 in the case of heating performance priority (Yes) in step S302. Also, the outdoor controller 202 performs step S310 to step S316 in the case of cooling performance priority (No).

Step S303 to step S309 will be described below. In step S303, the outdoor controller 202 increases the condensing temperature target value Tcm by ΔTcm. At this time, in the case where the air-conditioning apparatus is performing a heating main operation, the rotation speed F of the compressor 11 is controlled based on the condensing temperature Tc. Accordingly, if the rotation speed F is smaller than the maximum rotation speed Fmax, the rotation speed F of the compressor 11 increases when the condensing temperature target value Tcm increases. On the other hand, in the case where the air-conditioning apparatus is performing a cooling main operation, the heat exchange amount adjusting means of the outdoor heat exchanger 13 is controlled based on the condensing temperature Tc. Accordingly, within a range in which the heat exchange amount adjusting means of the outdoor heat exchanger 13 is operable, the heat exchange amount adjusting means operates when the condensing temperature target value Tcm increases, and heat conductance of the outdoor heat exchanger 13 decreases.

In step S304, the outdoor controller 202 transmits a heating performance suppression mode to the relay unit controller 206. The relay unit controller 206 transmits the performance suppression mode to the indoor unit 2 that is performing a heating operation among the direct-expansion indoor units 2a, 2b, 2c, and 2d. The indoor controller 203 of the indoor unit 2 that has received the performance suppression mode increases the degree-of-subcooling target value SCm of the indoor heat exchanger 31 by ΔSCm in step S305. At this time, the opening degree L of the expansion valve 32 is controlled based on the calculated degree of subcooling SC. Accordingly, the opening degree L decreases when the degree-of-subcooling target value SCm increases.

After the outdoor controller 202 allows a predetermined period to pass in step S306, the outdoor controller 202 determines whether the rotation speed F of the compressor 11 is smaller than the maximum value Fmax in step S307. If the rotation speed F is smaller than Fmax (Yes), the outdoor controller 202 transmits a refrigerant flow rate increase mode to the heat medium relay unit 8 in step S308. The heat medium relay unit controller 207 that has received the refrigerant flow rate increase mode decreases the degree-of-subcooling target value SCm of the intermediate heat exchanger 82 by ΔSCm in step S309. At this time, the opening degree L of the expansion valve 86 is controlled based on the calculated degree of subcooling SC. Accordingly, the opening degree L increases when the degree-of-subcooling target value SCm decreases. That is, when the degree-of-subcooling target value SCm for the expansion valve 86 decreases, the amount of refrigerant that flows through the intermediate heat exchanger 82 increases. At this point, the flow for changing the values of the condensing temperature target value Tcm and the degree-of-subcooling target value SCm ends; however, the resulting Tcm and SCm are maintained until the heating performance priority request is canceled by the operation unit 208 of the heat medium relay unit 8. If the rotation speed F is Fmax (No) in step S307, the flow ends.

Next, step S310 to step S316 will be described below. In step S310, the outdoor controller 202 decreases the evaporating temperature target value Tem by ΔTem. At this time, in the case where the air-conditioning apparatus is performing a cooling main operation, the rotation speed F of the compressor 11 is controlled based on the evaporating temperature Te. Accordingly, if the rotation speed F is smaller than the maximum rotation speed Fmax, the rotation speed F of the compressor 11 increases when the evaporating temperature target value Tem decreases. On the other hand, in the case where the air-conditioning apparatus is performing a heating main operation, the heat exchange amount adjusting means of the outdoor heat exchanger 13 is controlled based on the evaporating temperature Te. Accordingly, a range in which the heat exchange amount adjusting means of the outdoor heat exchanger 13 is operable, the heat exchange amount adjusting means operates when the condensing temperature target value Tem decreases, and heat conductance of the outdoor heat exchanger 13 decreases.

In step S311, the outdoor controller 202 transmits a cooling performance suppression mode to the relay unit controller 206. The relay unit controller 206 transmits the performance suppression mode to the indoor unit 2 that is performing a cooling operation among the direct-expansion indoor units 2a, 2b, 2c, and 2d. The indoor controller 203 of the indoor unit 2 that has received the performance suppression mode increases the degree-of-superheat target value SHm of the indoor heat exchanger 31 by ΔSHm in step S312. At this time, the opening degree L of the expansion valve 32 is controlled based on the calculated degree of superheat SH. Accordingly, the opening degree L decreases when the degree-of-superheat target value SHm increases.

After the outdoor controller 202 allows a predetermined period to pass in step S313, the outdoor controller 202 decreases whether the rotation speed F of the compressor 11 is smaller than the maximum value Fmax in step S314. If the rotation speed F is smaller than Fmax (Yes), the outdoor controller 202 transmits a refrigerant flow rate increase mode to the heat medium relay unit 8 in step S315. The heat medium relay unit controller 207 that has received the refrigerant flow rate increase mode reduces the degree-of-superheat target value SHm of the intermediate heat exchanger 81 by ΔSHm in step S316. At this time, the opening degree L of the expansion valve 85 is controlled based on the calculated degree of superheat SH. Accordingly, the opening degree L increases when the degree-of-superheat target value SHm decreases. That is, when the degree-of-superheat target value SHm of the expansion valve 85 decreases, the amount of refrigerant that flows through the intermediate heat exchanger 81 increases. At this point, the flow for changing the values of the evaporating temperature target value Tem and the degree-of-superheat target value SHm ends; however, the resulting Tem and SHm are maintained until the cooling performance priority request is canceled by the operation unit 208 of the heat medium relay unit 8. If the rotation speed F is Fmax (No) in step S314, the flow ends.

<Conditions for Heating Performance Increase Request or Cooling Performance Increase Request>

As described before, the operation unit 208 makes a request to increase heating performance or to increase cooling performance when the heat medium relay unit 8 and the indirect indoor units 2 are in the water-cooling and water-heating mixed mode.

Now, conditions under which the operation unit 208 makes a request to increase heating performance will be described. Conditions under which heating performance of the intermediate heat exchanger 82 needs to be increased include the heating capacity of the operating indirect indoor units 2 being sufficiently larger than the cooling capacity and the heating load being actually large. Accordingly, in Embodiment 3, the operation unit 208 makes determinations regarding the following three conditions to make a request to increase heating performance.

(Condition 1A: Ratio Between Heating Capacity and Cooling Capacity)

$$\Sigma Qh > \Sigma Qc + \alpha \quad (1)$$

Here, ΣQh represents the sum of capacity ratings of the indirect indoor units 2 that are performing a heating operation, ΣQc represents the sum of capacity ratings of the indirect indoor units 2 that are performing a cooling operation, and α represents a likelihood.

(Condition 2A: Temperature of Heat Medium at Inlet of Indoor Heat Exchanger 31)

$$Twhin < Twhm - \beta \quad (2)$$

Here, Twhin represents the temperature of the heat medium at the inlet of the indoor unit 2 during heating, Twhm represents the target value of the temperature of the heat medium at the inlet of the indoor unit 2 during heating, and β represents a likelihood. In the case where the load of the indoor unit 2 that is performing a heating operation is large (sucked air temperature is low), Twhin lowers.

(Condition 3A: Heat Medium Outlet-Inlet Temperature Difference, Opening Degree of Flow Control Valve, and Rotation Speed of Pump)

$$\text{"}\Delta Twhmax > \Delta Twhm + \gamma \text{ and } Lmax = 100\%\text{" and}$$
$$\text{"}Fp = 100\%\text{"} \quad (3)$$

Here, ΔTwhmax represents the largest value among heat medium outlet-inlet temperature differences of the indoor units 2 (more specifically, the indoor heat exchangers 31 of the indoor units 2) that are performing heating, ΔTwhm represents the target value of the heat medium outlet-inlet temperature difference of the indoor unit 2 that is performing heating, and γ represents a likelihood. In the case where the heating load is large, the heat medium outlet-inlet temperature difference increases.

Also, L represents the opening degree of the flow control valve 95 of the indoor unit 2 that is performing heating, and Lmax represents the largest value among these opening degrees. In the case of Lmax=100%, it is indicated that the entire flow rate of the heat medium related to heating is insufficient.

Also, Fp represents the rotation speed of the pump 92. In the case where Fp is 100%, it is indicated that the entire flow rate of the heat medium related to heating is insufficient.

The above is summarized as follows. When $$\text{(Condition 1A) and (Condition 2A)} \quad (4)$$

or $$\text{(Condition 1A) and (Condition 3A)} \quad (5)$$

are satisfied for a predetermined period, the operation unit 208 can make a request to increase heating performance. When determination is made for these conditions, the actuators in the refrigerant passage and the heat medium passage need to be sufficiently stable, and it is desirable that the predetermined period be approximately 10 to 30 minutes.

Similarly, conditions under which cooling performance of the intermediate heat exchanger 81 needs to be increased include the heating capacity of the operating indirect indoor units 2 being sufficiently larger than the heating capacity and the cooling load being actually large. Accordingly, conditions under which the operation unit 208 makes a request to increase cooling performance may be as follows.

(Condition 1B: Ratio Between Heating Capacity and Cooling Capacity)

$$\Sigma Qc > \Sigma Qh + \alpha \quad (6)$$

(Condition 2B: Temperature of Heat Medium at Inlet of Indoor Heat Exchanger 31)

$$Twcin > Twcm + \beta \quad (7)$$

Here, Twcin represents the temperature of the heat medium at the inlet of the indoor unit 2 during cooling, and Twcm represents the target value of the temperature of the heat medium at the inlet of the indoor unit 2 during cooling. In the case where the load of the indoor unit 2 that is performing the cooling operation is large (sucked air temperature is high), Twcin increases.

(Condition 3B: Heat Medium Outlet-Inlet Temperature Difference, Opening Degree of Flow Control Valve, and Rotation Speed of Pump)

$$\text{"}\Delta Twcmax > Twcm + \gamma \text{ and } Lmax = 100\%\text{" and}$$
$$\text{"}Fp = 100\%\text{"} \quad (8)$$

Here, ΔTwcmax represents the largest value among heat medium outlet-inlet temperature differences of the indoor units 2 that are performing cooling, and ΔTwcm denotes the target value of the heat medium outlet-inlet temperature difference of the indoor unit 2 that is performing cooling. In the case where the cooling load is large, the heat medium outlet-inlet temperature difference increases.

Also, in the case of Lmax=100%, it is indicated that the entire flow rate of the heat medium related to cooling is insufficient.

Also, in the case where Fp is 100%, it is indicated that the entire flow rate of the heat medium related to cooling is insufficient.

The above is summarized as follows. When $$\text{(Condition 1B) and (Condition 2B)} \quad (9)$$

or $$\text{(Condition 1B) and (Condition 3B)} \quad (10)$$

are satisfied for a predetermined period, the operation unit 208 may make a request to increase cooling performance. When determination is made for these conditions, the actuators in the refrigerant passage and the heat medium passage need to be sufficiently stable, and it is desirable that the predetermined period be approximately 10 to 30 minutes.

In addition, if the evaporating temperature target value Tem is made too small during a cooling operation, the heat medium possibly freezes at the intermediate heat exchanger 81 and the intermediate heat exchanger 81 is possibly destroyed. For this reason, Tem may be set to a temperature at which the heat medium does not freeze.

<Effects of Control for Increasing Performance>

As described above, in the air-conditioning apparatus according to Embodiment 3, in the case where the heat medium relay unit 8 and the indirect indoor units 2 are in the water-cooling and water-heating mixed mode, heating performance or cooling performance can be increased by performing control for increasing performance on the intermediate heat exchanger 81 or the intermediate heat exchanger 82. Accordingly, it is not necessary to increase the sizes or the numbers of intermediate heat exchangers 81 and 82 and pumps 91 and 92, and the air-conditioning apparatus can be made smaller and less costly.

Also, in the air-conditioning apparatus according to Embodiment 3, because a request to increase heating performance is made when the heating load is large and a request to increase cooling performance is made when the cooling performance is large, control for increasing performance is not performed unnecessarily, and an air-conditioning apparatus having excellent energy saving performance can be provided.

Also, in the air-conditioning apparatus according to Embodiment 3, performance of the direct-expansion indoor unit 2 is suppressed when control for increasing performance is performed on the intermediate heat exchanger 81 or 82. The refrigerant directly circulates within the direct-expansion indoor heat exchanger 31, and thus heating performance increases when the condensing temperature rises and cooling performance increases when the evaporating temperature falls. Accordingly, by suppressing the performance, the performance of the direct-expansion indoor unit 2 is suppressed from becoming excessive.

In Embodiment 1 to Embodiment 3 described above, performance of only one heat exchanger is increased; however, the number of heat exchangers whose performance is to be increased may be any given number. Also, in Embodiment 1 to Embodiment 3 described above, the flow rate of refrigerant is decreased in all heat exchangers other than the performance-increased heat exchanger; however, the present invention can be carried out as long as the flow rate of refrigerant can be decreased in at least one heat exchanger other than the performance-increased heat exchanger.

INDUSTRIAL APPLICABILITY

As application examples of the present invention, the present invention is applicable to a multi-room air-conditioning apparatus used as a multi-air-conditioning apparatus for a building or the like.

REFERENCE SIGNS LIST

1 outdoor unit, 2 indoor unit, 3 relay unit, 4 gas pipe, liquid pipe, 6 high-pressure pipe, 7 low-pressure pipe, 8 heat medium relay unit, 11 compressor, 12 four-way valve, 13 outdoor heat exchanger, 14 accumulator, 15 check valve, 31 indoor heat exchanger, 32 expansion valve, 41 gas branch pipe, liquid branch pipe, 51 gas-liquid separator, 52, 53 internal heat exchanger, 54, 55 expansion valve, 56, 57 solenoid valve, 58, 59 check valve, 61 high-pressure gas pipe, 62, 63, 64 liquid pipe, 65 bypass pipe, 66 high-pressure gas pipe, 67 liquid pipe, 68 low-pressure pipe, 69 bypass pipe, 71, 72 pressure sensor, 73, 74, 75 temperature sensor, 76, 77 pressure sensor, 81, 82 intermediate heat exchanger, 83, 84 four-way valve, 85, 86, 87 expansion valve, 88 internal heat exchanger, 91, 92 pump, 93, 94 three-way valve, 95 flow control valve, 101 fan, 111, 112, 113, 114, 115, 116 heat medium pipe, 131, 132, 133, 134, 135, 136, 137 temperature sensor, 138 pressure sensor, 201 inverter circuit, 202 outdoor controller, 203 indoor controller, 204 operation unit, 205 valve driving circuit, 206 relay unit controller, 207 heat medium relay unit controller, 208 operation unit, 209 valve driving circuit, 210 pump driving circuit.

The invention claimed is:

1. An air-conditioning apparatus comprising:
a compressor; a heat source side heat exchanger configured to function as a condenser or an evaporator; a plurality of use side heat exchangers each configured to function as a condenser or an evaporator; a plurality of expansion devices each provided for a corresponding one of the plurality of use side heat exchangers, and each configured to adjust a flow rate of a refrigerant that flows through the corresponding one of the plurality of use side heat exchangers; and a controller configured to control an operation capacity of the compressor and opening degrees of the plurality of expansion devices, wherein when increasing heat exchange performance of a first use side heat exchanger that is at least one, but not all, of the plurality of use side heat exchangers, the controller increases the operation capacity of the compressor, and controls the opening degree of the expansion device corresponding to a second use side heat exchanger that is at least one of the plurality of use side heat exchangers that perform a function identical to a function of the first use side heat exchanger, to decrease a flow rate of the refrigerant that flows through the second use side heat exchanger, the second use side heat exchanger being different from the first use side heat exchanger, the heat source side heat exchanger is configured to function as an evaporator and the plurality of use side heat exchangers are configured to function as condensers, the controller is configured to control the operation capacity of the compressor such that condensing saturation temperatures of the refrigerant that flows through the plurality of use side heat exchangers become a predetermined condensing saturation temperature target value, and when increasing the heat exchange performance of the first use side heat exchanger, the controller increases the operation capacity of the compressor by increasing a value of the condensing saturation temperature target value, the controller is configured to control the opening degrees of the expansion devices corresponding to the plurality of use side heat exchangers that function as condensers such that degrees of subcooling of the refrigerant that flows through the plurality of use side heat exchangers that function as condensers become a predetermined target degree of subcooling, and when increasing the heat exchange performance of the first use side heat exchanger, decreases the flow rate in the second use side heat exchanger by increasing the target degree of subcooling.

2. The air-conditioning apparatus of claim 1, wherein if the operation capacity of the compressor has not reached an upper limit after the operation capacity of the compressor has been increased, the controller controls the opening degree of the expansion device corresponding to the first use side heat exchanger to increase a flow rate of the refrigerant that flows through the first use side heat exchanger.

3. The air-conditioning apparatus of claim 1, wherein some of the plurality of use side heat exchangers are intermediate heat exchangers at each of which the refrigerant supplied from the heat source side heat exchanger and a heat medium different from the refrigerant exchange heat, some of the rest of the plurality of use side heat exchangers are direct-expansion heat exchangers at each of which the refrigerant supplied from the heat source side heat exchanger and indoor air exchange heat, the air-conditioning apparatus further comprises at least one indirect heat exchanger that is connected to a heat medium passage of the intermediate heat exchangers and at which the heat medium and indoor air exchange heat, the first use side heat exchanger is the intermediate heat exchanger, and the second use side heat exchanger in which the flow rate of the refrigerant is decreased when the heat exchange performance of the first use side heat exchanger is increased is the direct-expansion heat exchanger.

4. An air-conditioning apparatus comprising:
a compressor; a heat source side heat exchanger configured to function as a condenser or an evaporator; a plurality of use side heat exchangers each configured to function as a condenser or an evaporator; a plurality of expansion devices each provided for a corresponding one of the plurality of use side heat exchangers, and each configured to adjust a flow rate of a refrigerant that flows through the corresponding one of the plurality of use side heat exchangers; and a controller configured to control an operation capacity of the compressor and opening degrees of the plurality of expansion devices, wherein when increasing heat exchange performance of a first use side heat exchanger that is at least one, but not all, of the plurality of use side heat exchangers, the controller increases the operation capacity of the compressor, and controls the opening degree of the expansion device corresponding to a second use side heat exchanger that is at least one of the plurality of use side heat exchangers that perform a function identical to a function of the first use side heat exchanger, to decrease a flow rate of the refrigerant that flows through the second use side heat exchanger, the second use side heat exchanger being different from the first use side heat exchanger, the heat source side heat exchanger is configured to function as a condenser and the plurality of use side heat exchangers are configured to function as evaporators, the controller is configured to control the operation capacity of the compressor such that evaporating saturation temperatures of the refrigerant that flows through the plurality of use side heat exchangers become a predetermined evaporating saturation temperature target value, and when increasing the heat exchange performance of the first use side heat exchanger, the controller increases the operation capacity of the compressor by decreasing a value of the evaporating saturation temperature target value, the controller is configured to control the opening degrees of the plurality of expansion devices of the plurality of use side heat exchangers that function as evaporators such that degrees of superheat of the refrigerant that flows through the use side heat exchangers become a predetermined target degree of superheat, and when increasing the heat exchange performance of the first use side heat exchanger, the controller decreases the flow rate in the second use side heat exchanger by increasing the target degree of superheat.

5. The air-conditioning apparatus of claim 4, wherein
some of the plurality of use side heat exchangers are intermediate heat exchangers at each of which the refrigerant supplied from the heat source side heat exchanger and a heat medium different from the refrigerant exchange heat,
some of the rest of the plurality of use side heat exchangers are direct-expansion heat exchangers at each of which the refrigerant supplied from the heat source side heat exchanger and indoor air exchange heat, the air-conditioning apparatus further comprises at least one indirect heat exchanger that is connected to a heat medium passage of the intermediate heat exchangers and at which the heat medium and indoor air exchange heat, the first use side heat exchanger is the intermediate heat exchanger, and the second use side heat exchanger in which the flow rate of the refrigerant is decreased when the heat exchange performance of the first use side heat exchanger is increased is the direct-expansion heat exchanger.

6. An air-conditioning apparatus comprising:
a compressor; a heat source side heat exchanger configured to function as a condenser or an evaporator; a plurality of use side heat exchangers each configured to function as a condenser or an evaporator; a plurality of expansion devices each provided for a corresponding one of the plurality of use side heat exchangers, and each configured to adjust a flow rate of a refrigerant that flows through the corresponding one of the plurality of use side heat exchangers; and a controller configured to control an operation capacity of the compressor and opening degrees of the plurality of expansion devices, wherein when increasing heat exchange performance of a first use side heat exchanger that is at least one, but not all, of the plurality of use side heat exchangers, the controller increases the operation capacity of the compressor, and controls the opening degree of the expansion device corresponding to a second use side heat exchanger that is at least one of the plurality of use side heat exchangers that perform a function identical to a function of the first use side heat exchanger, to decrease a flow rate of the refrigerant that flows through the second use side heat exchanger, the second use side heat exchanger being different from the first use side heat exchanger, the heat source side heat exchanger is configured to function as an evaporator, some of the plurality of use side heat exchangers are configured to function as condensers, and some of the rest of the plurality of use side heat exchangers are configured to function as evaporators, the controller controls the operation capacity of the compressor such that condensing saturation temperatures of the refrigerant that flows through the plurality of use side heat exchangers that function as condensers become a predetermined condensing saturation temperature target value, the first use side heat exchanger is configured to function as a condenser, and when increasing the heat exchange performance of the first use side heat exchanger, the controller increases the operation capacity of the compressor by increasing a value of the condensing saturation temperature target value, and the controller is configured to control the opening degrees of the plurality of expansion devices corresponding to the plurality of use side heat exchangers that function as condensers such that degrees of subcooling of the refrigerant that flows through the plurality of use side heat exchangers that function as condensers become a predetermined target degree of subcooling, and when increasing the heat exchange performance of the first use side heat exchanger, the controller decreases the flow rate in the second use side heat exchanger by increasing the target degree of subcooling.

7. The air-conditioning apparatus of claim 6, wherein
some of the plurality of use side heat exchangers are intermediate heat exchangers at each of which the refrigerant supplied from the heat source side heat exchanger and a heat medium different from the refrigerant exchange heat,
some of the rest of the plurality of use side heat exchangers are direct-expansion heat exchangers at each of which the refrigerant supplied from the heat source side heat exchanger and indoor air exchange heat,
the air-conditioning apparatus further comprises at least one indirect heat exchanger which is connected to a heat medium passage of the intermediate heat exchangers and at which the heat medium and indoor air exchange heat,
the intermediate heat exchangers include an intermediate heat exchanger configured to function as a condenser and an intermediate heat exchanger configured to function as an evaporator,
the first use side heat exchanger is the intermediate heat exchanger connected to the indirect heat exchanger having a larger heat exchange load, and
the second use side heat exchanger in which the flow rate of the refrigerant is decreased when the heat exchange performance of the first use side heat exchanger is increased is the direct-expansion heat exchanger.

8. The air-conditioning apparatus of claim 6, wherein
some of the plurality of use side heat exchangers are intermediate heat exchangers at each of which the refrigerant supplied from the heat source side heat exchanger and a heat medium different from the refrigerant exchange heat,
some of the rest of the plurality of use side heat exchangers are direct-expansion heat exchangers at each of which the refrigerant supplied from the heat source side heat exchanger and indoor air exchange heat,
the air-conditioning apparatus further comprises at least one indirect heat exchanger that is connected to a heat medium passage of the intermediate heat exchangers and at which the heat medium and indoor air exchange heat,
the first use side heat exchanger is the intermediate heat exchanger, and
the second use side heat exchanger in which the flow rate of the refrigerant is decreased when the heat exchange performance of the first use side heat exchanger is increased is the direct-expansion heat exchanger.

9. An air-conditioning apparatus comprising:
a compressor; a heat source side heat exchanger configured to function as a condenser or an evaporator; a plurality of use side heat exchangers each configured to function as a condenser or an evaporator; a plurality of expansion devices each provided for a corresponding one of the plurality of use side heat exchangers, and each configured to adjust a flow rate of a refrigerant that flows through the corresponding one of the plurality of use side heat exchangers; and a controller configured to control an operation capacity of the compressor and opening degrees of the plurality of expansion devices, wherein
when increasing heat exchange performance of a first use side heat exchanger that is at least one, but not all, of the plurality of use side heat exchangers, the controller increases the operation capacity of the compressor, and controls the opening degree of the expansion device corresponding to a second use side heat exchanger that is at least one of the plurality of use side heat exchangers that perform a function identical to a function of the first use side heat exchanger, to decrease a flow rate of the refrigerant that flows through the second use side heat exchanger, the second use side heat exchanger being different from the first use side heat exchanger,
the heat source side heat exchanger is configured to function as a condenser, some of the plurality of use side heat exchangers are configured to function as condensers, and some of the rest of the plurality of use side heat exchangers are configured to function as evaporators,
the controller controls the operation capacity of the compressor such that evaporating saturation temperatures of the refrigerant that flows through the plurality of use side heat exchangers that function as evaporators become a predetermined evaporating saturation temperature target value,
the first use side heat exchanger is configured to function as an evaporator, and
when increasing the heat exchange performance of the first use side heat exchanger, the controller increases the operation capacity of the compressor by decreasing a value of the evaporating saturation temperature target value,
the controller is configured to control the opening degrees of the plurality of expansion devices of the plurality of use side heat exchangers that function as evaporators such that degrees of superheat of the refrigerant that flows through the plurality of use side heat exchangers become a predetermined target degree of superheat, and
when increasing the heat exchange performance of the first use side heat exchanger, the controller decreases the flow rate in the second use side heat exchanger by increasing the target degree of superheat.

10. The air-conditioning apparatus of claim 9, wherein
some of the plurality of use side heat exchangers are intermediate heat exchangers at each of which the refrigerant supplied from the heat source side heat exchanger and a heat medium different from the refrigerant exchange heat,
some of the rest of the plurality of use side heat exchangers are direct-expansion heat exchangers at each of which the refrigerant supplied from the heat source side heat exchanger and indoor air exchange heat,
the air-conditioning apparatus further comprises at least one indirect heat exchanger which is connected to a heat medium passage of the intermediate heat exchangers and at which the heat medium and indoor air exchange heat,
the intermediate heat exchangers include an intermediate heat exchanger configured to function as a condenser and an intermediate heat exchanger configured to function as an evaporator,
the first use side heat exchanger is the intermediate heat exchanger connected to the indirect heat exchanger having a larger heat exchange load, and
the second use side heat exchanger in which the flow rate of the refrigerant is decreased when the heat exchange performance of the first use side heat exchanger is increased is the direct-expansion heat exchanger.

11. The air-conditioning apparatus of claim 9, wherein
some of the plurality of use side heat exchangers are intermediate heat exchangers at each of which the refrigerant supplied from the heat source heat exchanger and a heat medium different from the refrigerant exchange heat, some of the rest of the plurality of use side heat exchangers are direct-expansion heat exchangers at each of which the refrigerant supplied from the heat source side heat exchanger and indoor air exchange heat, the air-conditioning apparatus further comprises at least one indirect heat exchanger that is connected to a heat medium passage of the intermediate heat exchangers and at which the heat medium and indoor air exchange heat, the first use side heat exchanger is the intermediate heat exchanger, and the second use side heat exchanger in which the flow rate of the refrigerant is decreased when the heat exchange performance of the first use side heat exchanger is increased is the direct-expansion heat exchanger.

* * * * *